(12) United States Patent
van der Merwe et al.

(10) Patent No.: US 9,587,176 B2
(45) Date of Patent: Mar. 7, 2017

(54) PROCESS FOR TREATING HIGH PARAFFIN DILUTED BITUMEN

(75) Inventors: Shawn van der Merwe, Calgary (CA); Ilie Cheta, Calgary (CA)

(73) Assignee: FORT HILLS ENERGY L.P., Calgary (CA)

( * ) Notice: Subject to any disclaimer, the term of this patent is extended or adjusted under 35 U.S.C. 154(b) by 692 days.

(21) Appl. No.: 14/001,660

(22) PCT Filed: Feb. 1, 2012

(86) PCT No.: PCT/CA2012/050058
§ 371 (c)(1),
(2), (4) Date: Dec. 6, 2013

(87) PCT Pub. No.: WO2012/113074
PCT Pub. Date: Aug. 30, 2012

(65) Prior Publication Data
US 2014/0083911 A1 Mar. 27, 2014

(30) Foreign Application Priority Data

Feb. 25, 2011 (CA) .................................... 2733332

(51) Int. Cl.
*C10G 1/04* (2006.01)
*C10G 21/28* (2006.01)

(52) U.S. Cl.
CPC ............. *C10G 1/04* (2013.01); *C10G 1/042* (2013.01); *C10G 1/045* (2013.01); *C10G 21/28* (2013.01); *C10G 2300/206* (2013.01)

(58) Field of Classification Search
CPC .......... C10G 1/04; C10G 1/045; C10G 1/042; C10G 21/28; C10G 2300/206
See application file for complete search history.

(56) References Cited

U.S. PATENT DOCUMENTS

| 181,668 A | 8/1876 | Gregg et al. |
| 654,965 A | 7/1900 | Franke |

(Continued)

FOREIGN PATENT DOCUMENTS

| CA | 918091 A1 | 1/1973 |
| CA | 918588 A1 | 1/1973 |

(Continued)

OTHER PUBLICATIONS

Heat-Exchanger Bypass Control, William L. Luyben, Ind. Eng. Chem. Res. 2011, 50, 965-973.*

(Continued)

*Primary Examiner* — Randy Boyer
*Assistant Examiner* — Juan Valencia
(74) *Attorney, Agent, or Firm* — Marshall, Gerstein & Borun LLP

(57) ABSTRACT

A paraffinic solvent recovery process for treating high paraffin diluted bitumen includes supplying the latter to flashing apparatus; separating into flashed paraffinic solvent and diluted bitumen underflow; and returning a portion of the underflow as returned diluted bitumen into the high paraffin diluted bitumen prior to introduction into the flashing apparatus, at temperature and amount to shift asphaltene precipitation equilibrium to reduce asphaltene precipitation. The process includes pre-heating the high paraffin diluted bitumen by transferring heat from hot dry bitumen, flashed paraffinic solvent and/or a portion of diluted bitumen underflow. Flashed paraffinic solvent may contain residual light end bitumen contaminants that increase asphaltenes solubility and the process may include removing contaminants to produce reusable paraffinic solvent at given solvent-to-bitumen ratio range to maintain given asphaltene precipitation. The process may also include a bitumen fractionation (Continued)

column producing hot dry bitumen underflow containing at most 0.5 wt % paraffinic solvent.

38 Claims, 8 Drawing Sheets

(56) References Cited

U.S. PATENT DOCUMENTS

| | | |
|---|---|---|
| 1,085,135 A | 1/1914 | Kelly, Jr. |
| 1,147,356 A | 7/1915 | Allen |
| 1,159,044 A | 11/1915 | Kelly, Jr. |
| 1,201,558 A | 10/1916 | Cobb |
| 1,254,562 A | 1/1918 | Allen |
| 1,261,671 A | 4/1918 | Zachert |
| 1,494,375 A | 5/1924 | Reilly |
| 1,754,119 A | 4/1930 | Pink |
| 1,777,535 A | 10/1930 | Walcott Stratford |
| 2,010,008 A | 8/1935 | Bray |
| 2,047,989 A | 7/1936 | Woelflin |
| 2,091,078 A | 8/1937 | McKittrick et al. |
| 2,111,717 A | 3/1938 | Young |
| 2,188,013 A | 1/1940 | Pilat et al. |
| 2,240,008 A | 4/1941 | Atwell |
| 2,410,483 A | 11/1946 | Dons et al. |
| 2,853,426 A | 9/1958 | Peet |
| 2,868,714 A | 1/1959 | Gilmore |
| 3,081,823 A | 3/1963 | Constantikes |
| 3,220,193 A | 11/1965 | Sttohmeyer, Jr. |
| 3,271,293 A | 9/1966 | Clark |
| 3,278,415 A | 10/1966 | Doberenz et al. |
| 3,291,569 A | 12/1966 | Joseph Rossi |
| 3,575,842 A | 4/1971 | Simpson |
| 3,705,491 A | 12/1972 | Foster-Pegg |
| 3,779,902 A | 12/1973 | Mitchell et al. |
| 3,808,120 A | 4/1974 | Smith |
| 3,901,791 A | 8/1975 | Baillie |
| 3,929,625 A | 12/1975 | Lucas |
| 3,954,414 A | 5/1976 | Samson, Jr. et al. |
| 3,957,655 A | 5/1976 | Barefoot |
| 4,013,542 A | 3/1977 | Gudelis et al. |
| 4,035,282 A | 7/1977 | Stuchberry et al. |
| 4,115,241 A | 9/1978 | Harrison et al. |
| 4,116,809 A | 9/1978 | Kizior |
| 4,120,775 A | 10/1978 | Murray et al. |
| 4,140,620 A | 2/1979 | Paulett |
| 4,209,422 A | 6/1980 | Zimmerman et al. |
| 4,210,820 A | 7/1980 | Wittig |
| 4,230,467 A | 10/1980 | Buchwald |
| 4,251,627 A | 2/1981 | Calamur |
| 4,284,242 A | 8/1981 | Randell |
| 4,314,974 A | 2/1982 | Libby et al. |
| 4,315,815 A | 2/1982 | Gearhart |
| 4,321,147 A | 3/1982 | McCoy et al. |
| 4,324,652 A | 4/1982 | Hack |
| 4,342,657 A | 8/1982 | Blair |
| 4,346,560 A | 8/1982 | Rapier |
| 4,395,330 A | 7/1983 | Auboir et al. |
| 4,410,417 A | 10/1983 | Miller et al. |
| 4,425,227 A | 1/1984 | Smith |
| 4,461,696 A | 7/1984 | Bock et al. |
| 4,470,899 A | 9/1984 | Miller et al. |
| 4,495,057 A | 1/1985 | Amirijafari et al. |
| 4,514,305 A | 4/1985 | Filby |
| 4,518,479 A | 5/1985 | Schweigharett et al. |
| 4,532,024 A | 7/1985 | Haschke et al. |
| 4,539,093 A | 9/1985 | Friedman et al. |
| 4,545,892 A | 10/1985 | Cymbalisty et al. |
| 4,572,781 A | 2/1986 | Krasuk et al. |
| 4,584,087 A | 4/1986 | Peck |
| 4,609,455 A | 9/1986 | Weimer et al. |
| 4,634,520 A | 1/1987 | Angelov et al. |
| 4,640,767 A | 2/1987 | Zajic et al. |
| 4,644,974 A | 2/1987 | Zingg |
| 4,648,964 A | 3/1987 | Leto et al. |
| 4,678,558 A | 7/1987 | Belluteau et al. |
| 4,722,782 A | 2/1988 | Graham et al. |
| 4,726,759 A | 2/1988 | Wegnwe |
| 4,781,819 A | 11/1988 | Chirinos et al. |
| 4,802,975 A | 2/1989 | Mehlberg |
| 4,822,481 A | 4/1989 | Taylor |
| 4,828,688 A | 5/1989 | Corti et al. |
| 4,859,317 A | 8/1989 | Shelfantook et al. |
| 4,888,108 A | 12/1989 | Farnand |
| 4,906,355 A | 3/1990 | Lechnick et al. |
| 4,929,341 A | 5/1990 | Thirumalachar et al. |
| 4,931,072 A | 6/1990 | Striedieck |
| 4,950,363 A | 8/1990 | Silvey |
| 4,966,685 A | 10/1990 | Hall et al. |
| 4,968,413 A | 11/1990 | Datta et al. |
| 5,022,983 A | 6/1991 | Myers et al. |
| 5,039,227 A | 8/1991 | Leung et al. |
| 5,133,837 A * | 7/1992 | Elmore ................. B01D 3/065 165/166 |
| 5,143,598 A | 9/1992 | Graham et al. |
| 5,186,820 A | 2/1993 | Schultz et al. |
| 5,223,148 A | 6/1993 | Tipman et al. |
| 5,236,577 A | 8/1993 | Tipman |
| 5,264,118 A | 11/1993 | Cymerman et al. |
| 5,282,984 A | 2/1994 | Ashrawi |
| 5,298,167 A | 3/1994 | Arnold |
| 5,443,046 A | 8/1995 | White |
| 5,558,768 A | 9/1996 | Ikura et al. |
| 5,645,714 A | 7/1997 | Strand et al. |
| 5,690,811 A | 11/1997 | Davis et al. |
| 5,817,398 A | 10/1998 | Hollander |
| 5,871,634 A | 2/1999 | Wiehe et al. |
| 5,876,592 A | 3/1999 | Tipman et al. |
| 5,879,540 A | 3/1999 | Zinke et al. |
| 5,914,010 A | 6/1999 | Hood et al. |
| 5,937,817 A | 8/1999 | Schanz et al. |
| 5,948,241 A | 9/1999 | Owen |
| 5,954,277 A | 9/1999 | Maciejewski et al. |
| 5,968,349 A | 10/1999 | Duyvesteyn et al. |
| 5,985,138 A | 11/1999 | Humphreys |
| 5,988,198 A | 11/1999 | Neiman et al. |
| 5,997,723 A | 12/1999 | Wiehe et al. |
| 6,004,455 A | 12/1999 | Rendall |
| 6,007,708 A | 12/1999 | Allcock et al. |
| 6,007,709 A | 12/1999 | Duyvesteyn et al. |
| 6,019,888 A | 2/2000 | Mishra et al. |
| 6,036,748 A | 3/2000 | Wallace et al. |
| 6,076,753 A | 6/2000 | Maciejewski et al. |
| 6,110,359 A | 8/2000 | Davis et al. |
| 6,120,678 A | 9/2000 | Stephenson et al. |
| 6,159,442 A | 12/2000 | Thumm et al. |
| 6,214,213 B1 | 4/2001 | Tipman et al. |
| 6,355,159 B1 | 3/2002 | Myers et al. |
| 6,358,403 B1 | 3/2002 | Brown et al. |
| 6,361,025 B1 | 3/2002 | Cincotta et al. |
| 6,391,190 B1 | 5/2002 | Spence et al. |
| 6,482,250 B1 | 11/2002 | Williams et al. |
| 6,497,813 B2 | 12/2002 | Ackerson et al. |
| 6,523,573 B2 | 2/2003 | Robison et al. |
| 6,566,410 B1 | 5/2003 | Zaki et al. |
| 6,746,599 B2 | 6/2004 | Cymerman et al. |
| 6,800,116 B2 | 10/2004 | Stevens et al. |
| 7,152,851 B2 | 12/2006 | Cincotta |
| 7,357,857 B2 | 4/2008 | Hart et al. |
| 7,569,137 B2 | 8/2009 | Hyndman |
| 7,690,445 B2 | 4/2010 | Perez-Cordova |
| 7,749,378 B2 | 7/2010 | Iqbal et al. |
| 7,820,031 B2 | 10/2010 | D'Alessandro et al. |
| 7,909,989 B2 | 3/2011 | Duyvesteyn et al. |
| 7,934,549 B2 | 5/2011 | Cimolai |
| 8,133,316 B2 | 3/2012 | Poncelet et al. |
| 8,141,636 B2 | 3/2012 | Speirs et al. |
| 8,147,682 B2 | 4/2012 | Lahaie et al. |
| 8,157,003 B2 | 4/2012 | Hackett et al. |
| 8,252,107 B2 | 8/2012 | Esmaeili et al. |
| 8,261,831 B2 | 9/2012 | Lockhart et al. |
| 8,262,865 B2 | 9/2012 | Sharma et al. |
| 8,312,928 B2 | 11/2012 | Lockhart et al. |
| 8,343,337 B2 | 1/2013 | Moffett et al. |
| 8,354,020 B2 | 1/2013 | Sharma et al. |

(56) References Cited

U.S. PATENT DOCUMENTS

| | | |
|---|---|---|
| 8,357,291 B2 | 1/2013 | Sury et al. |
| 8,382,976 B2 | 2/2013 | Moran et al. |
| 8,394,180 B2 | 3/2013 | Diaz et al. |
| 8,449,764 B2 | 5/2013 | Chakrabarty et al. |
| 8,454,821 B2 | 6/2013 | Chakrabarty et al. |
| 8,455,405 B2 | 6/2013 | Chakrabarty |
| 8,550,258 B2 | 10/2013 | Bara et al. |
| 8,585,891 B2 | 11/2013 | Lourenco et al. |
| 2002/0043579 A1 | 4/2002 | Scheybeler |
| 2003/0089636 A1 | 5/2003 | Marchionna et al. |
| 2004/0074845 A1 | 4/2004 | Hagino et al. |
| 2004/0256325 A1 | 12/2004 | Frankiewicz |
| 2005/0150816 A1 | 7/2005 | Gaston |
| 2005/0150844 A1 | 7/2005 | Hyndman et al. |
| 2006/0065869 A1 | 3/2006 | Chipman et al. |
| 2006/0138055 A1 | 6/2006 | Garner et al. |
| 2006/0196812 A1 | 9/2006 | Beetge et al. |
| 2007/0125719 A1 | 6/2007 | Yarbrough et al. |
| 2007/0180741 A1 | 8/2007 | Bjornson et al. |
| 2007/0284283 A1 | 12/2007 | Duyvesteyn |
| 2008/0000810 A1 | 1/2008 | Garner et al. |
| 2008/0185350 A1 | 8/2008 | Remesat et al. |
| 2008/0210602 A1 | 9/2008 | Duyvesteyn |
| 2009/0134059 A1 | 5/2009 | Myers et al. |
| 2009/0200210 A1 | 8/2009 | Hommema |
| 2009/0200688 A1 | 8/2009 | Cincotta |
| 2009/0294328 A1 | 12/2009 | Iqbal |
| 2009/0321322 A1* | 12/2009 | Sharma ............... C10G 1/047 208/390 |
| 2009/0321324 A1 | 12/2009 | Sharma |
| 2010/0006474 A1 | 1/2010 | Gaston et al. |
| 2010/0076236 A1 | 3/2010 | Van Heuzen et al. |
| 2010/0078306 A1 | 4/2010 | Alhazmy |
| 2010/0089800 A1 | 4/2010 | MacDonald et al. |
| 2010/0096297 A1 | 4/2010 | Stevens et al. |
| 2010/0126395 A1 | 5/2010 | Gauthier |
| 2010/0126906 A1 | 5/2010 | Sury |
| 2010/0133149 A1 | 6/2010 | O'Connor et al. |
| 2010/0147516 A1 | 6/2010 | Betzer-Zilevitch |
| 2010/0155293 A1 | 6/2010 | Verstraete et al. |
| 2010/0155304 A1 | 6/2010 | Ding et al. |
| 2010/0206772 A1 | 8/2010 | Keppers |
| 2010/0243534 A1 | 9/2010 | Ng et al. |
| 2010/0258477 A1 | 10/2010 | Kukkonen et al. |
| 2010/0258478 A1 | 10/2010 | Moran et al. |
| 2010/0264068 A1 | 10/2010 | Ikebe et al. |
| 2010/0276341 A1 | 11/2010 | Speirs et al. |
| 2010/0276983 A1 | 11/2010 | Dunn et al. |
| 2010/0282642 A1 | 11/2010 | Kan |
| 2010/0298173 A1 | 11/2010 | Smith et al. |
| 2010/0320133 A1 | 12/2010 | Page et al. |
| 2011/0005750 A1 | 1/2011 | Boerseth et al. |
| 2011/0011769 A1 | 1/2011 | Sutton et al. |
| 2011/0061610 A1 | 3/2011 | Speirs et al. |
| 2011/0062090 A1 | 3/2011 | Bara |
| 2011/0089013 A1 | 4/2011 | Sakurai et al. |
| 2011/0100931 A1 | 5/2011 | Lake et al. |
| 2011/0127197 A1 | 6/2011 | Blackbourn et al. |
| 2011/0146164 A1 | 6/2011 | Haney et al. |
| 2011/0174683 A1 | 7/2011 | Cui et al. |
| 2011/0219680 A1 | 9/2011 | Wilkomirsky Fuica |
| 2011/0233115 A1 | 9/2011 | Moran et al. |
| 2011/0265558 A1 | 11/2011 | Feimer et al. |
| 2011/0284428 A1 | 11/2011 | Adeyinka et al. |
| 2012/0000830 A1 | 1/2012 | Monaghan et al. |
| 2012/0000831 A1 | 1/2012 | Moran et al. |
| 2012/0029259 A1 | 2/2012 | McFarlane et al. |
| 2012/0043178 A1 | 2/2012 | Kan |
| 2012/0074044 A1 | 3/2012 | Mcfarlane |
| 2012/0074045 A1 | 3/2012 | Stauffer et al. |
| 2012/0145604 A1 | 6/2012 | Wen |
| 2012/0175315 A1 | 7/2012 | Revington et al. |
| 2012/0217187 A1* | 8/2012 | Sharma ............... C10G 1/002 208/390 |
| 2012/0288419 A1 | 11/2012 | Esmaeili et al. |
| 2013/0043165 A1 | 2/2013 | Revington et al. |
| 2013/0081298 A1 | 4/2013 | Bugg et al. |
| 2013/0140249 A1 | 6/2013 | Sury et al. |
| 2013/0168294 A1 | 7/2013 | Chakrabarty et al. |
| 2013/0313886 A1 | 11/2013 | Van Der Merwe et al. |
| 2013/0345485 A1 | 12/2013 | Duerr et al. |
| 2014/0001101 A1 | 1/2014 | Van Der Merwe et al. |
| 2014/0011147 A1 | 1/2014 | Van Der Merwe |
| 2014/0048408 A1 | 2/2014 | Van Der Merwe et al. |
| 2014/0048450 A1 | 2/2014 | Van Der Merwe et al. |
| 2014/0076785 A1 | 3/2014 | Penner et al. |

FOREIGN PATENT DOCUMENTS

| | | |
|---|---|---|
| CA | 1027501 A1 | 3/1978 |
| CA | 1055868 | 6/1979 |
| CA | 1059052 A1 | 7/1979 |
| CA | 1072474 A1 | 2/1980 |
| CA | 1081641 A1 | 7/1980 |
| CA | 1111782 A1 | 11/1981 |
| CA | 1165712 A1 | 4/1984 |
| CA | 1237689 A1 | 6/1988 |
| CA | 1245990 A1 | 12/1988 |
| CA | 1247550 | 12/1988 |
| CA | 1249414 A1 | 1/1989 |
| CA | 1263331 A1 | 11/1989 |
| CA | 1267860 A1 | 4/1990 |
| CA | 1272975 A1 | 8/1990 |
| CA | 2012305 A1 | 9/1990 |
| CA | 2029795 A1 | 5/1991 |
| CA | 1291957 C | 11/1991 |
| CA | 1293465 C | 12/1991 |
| CA | 2021185 A1 | 1/1992 |
| CA | 2053016 A1 | 5/1992 |
| CA | 2053086 A1 | 4/1993 |
| CA | 2055213 A1 | 5/1993 |
| CA | 2075108 A1 | 1/1994 |
| CA | 2098656 A1 | 12/1994 |
| CA | 2123076 A1 | 11/1995 |
| CA | 2165865 A1 | 6/1997 |
| CA | 2174801 | 10/1997 |
| CA | 2188264 A1 | 4/1998 |
| CA | 2191517 A1 | 5/1998 |
| CA | 2200899 A1 | 9/1998 |
| CA | 2232929 A1 | 9/1998 |
| CA | 2149737 C | 3/1999 |
| CA | 2217300 A1 | 3/1999 |
| CA | 2254048 A1 | 5/1999 |
| CA | 2195604 C | 11/1999 |
| CA | 2350907 A1 | 5/2000 |
| CA | 2272045 A1 | 11/2000 |
| CA | 2304972 A1 | 10/2001 |
| CA | 2350001 A1 | 12/2002 |
| CA | 2353109 A1 | 1/2003 |
| CA | 2387257 A1 | 11/2003 |
| CA | 2527058 A1 | 3/2004 |
| CA | 2425840 A1 | 10/2004 |
| CA | 2454942 A1 | 7/2005 |
| CA | 2455011 A1 | 7/2005 |
| CA | 2726122 A1 | 7/2005 |
| CA | 2750837 A1 | 7/2005 |
| CA | 2750845 A1 | 7/2005 |
| CA | 2750934 A1 | 7/2005 |
| CA | 2750936 A1 | 7/2005 |
| CA | 2750939 A1 | 7/2005 |
| CA | 2750995 A1 | 7/2005 |
| CA | 2751587 A1 | 7/2005 |
| CA | 2751773 A1 | 7/2005 |
| CA | 2799354 A1 | 7/2005 |
| CA | 2799400 A1 | 7/2005 |
| CA | 2799739 A1 | 7/2005 |
| CA | 2520943 A1 | 4/2006 |
| CA | 2520943 A1 | 4/2006 |
| CA | 2490734 A1 | 6/2006 |
| CA | 2502329 A1 | 9/2006 |
| CA | 2521248 A1 | 3/2007 |
| CA | 2524110 A1 | 4/2007 |
| CA | 2526336 A1 | 5/2007 |
| CA | 2567185 A1 | 4/2008 |

(56) References Cited

FOREIGN PATENT DOCUMENTS

| | | |
|---|---|---|
| CA | 2610122 A1 | 5/2008 |
| CA | 2610124 A1 | 5/2008 |
| CA | 2573633 A1 | 7/2008 |
| CA | 2673961 A1 | 7/2008 |
| CA | 2582059 A1 | 9/2008 |
| CA | 2588043 A1 | 11/2008 |
| CA | 2606312 A1 | 4/2009 |
| CA | 2610052 A1 | 5/2009 |
| CA | 2616036 A1 | 6/2009 |
| CA | 2654611 A1 | 8/2009 |
| CA | 2630392 A1 | 11/2009 |
| CA | 2669059 A1 | 12/2009 |
| CA | 2638120 A1 | 1/2010 |
| CA | 2673981 A1 | 1/2010 |
| CA | 2673982 A1 | 1/2010 |
| CA | 2641294 A1 | 4/2010 |
| CA | 2655852 A1 | 4/2010 |
| CA | 2683374 A1 | 4/2010 |
| CA | 2643893 A1 | 5/2010 |
| CA | 2647855 A1 | 7/2010 |
| CA | 2649928 A1 | 7/2010 |
| CA | 2652355 A1 | 8/2010 |
| CA | 2653032 A1 | 8/2010 |
| CA | 2653058 A1 | 8/2010 |
| CA | 2689684 A1 | 8/2010 |
| CA | 2657360 A1 | 9/2010 |
| CA | 2657801 A1 | 10/2010 |
| CA | 2661579 A1 | 10/2010 |
| CA | 2711136 A1 | 10/2010 |
| CA | 2666025 A1 | 11/2010 |
| CA | 2708416 A1 | 12/2010 |
| CA | 2674246 A1 | 1/2011 |
| CA | 2708048 A1 | 1/2011 |
| CA | 2678818 A1 | 3/2011 |
| CA | 2701317 A1 | 3/2011 |
| CA | 2717406 A1 | 4/2011 |
| CA | 2729457 A1 | 7/2011 |
| CA | 2733862 A1 | 7/2011 |
| CA | 2705055 A1 | 11/2011 |
| CA | 2768852 A1 | 11/2011 |
| CA | 2748477 A1 | 3/2012 |
| CA | 2752558 A1 | 3/2012 |
| CA | 2730467 A1 | 8/2012 |
| CA | 2735311 A1 | 9/2012 |
| CA | 2737410 A | 10/2012 |
| CA | 2740935 A | 11/2012 |
| CN | 1187300 A | 7/1998 |
| EP | 0059106 A2 | 9/1982 |
| GB | 587798 A | 5/1947 |
| GB | 2044796 A | 10/1980 |
| GB | 2145730 A | 4/1985 |
| JP | S56150407 A | 11/1981 |
| JP | S57200402 A | 12/1982 |
| JP | S6285415 U | 5/1987 |
| RU | 2065455 C1 | 8/1996 |
| RU | 2078095 C1 | 4/1997 |
| RU | 2096438 C1 | 11/1997 |
| WO | 2007102819 A1 | 9/2007 |
| WO | 2009111871 A1 | 9/2009 |
| WO | 2010088388 A1 | 8/2010 |

OTHER PUBLICATIONS

Dutta-B, Principles of Mass Transfer and Separation Processes, p. 344, 2009.*
International Search Report in corresponding PCT/CA2012/050058 mailed Apr. 23, 2012.
Written Opinion in corresponding PCT/CA2012/050058 mailed Apr. 23, 2012.
Andrews et al. "Great Canadian Oil Sands Experience in Commercial Processing of Athabasca Tar Sands" American Chemical Society San Francisco Meeting Apr. 2-5 1968, p. F5-F18.
Mitchell et al. "The solubility of asphaltenes in hydrocarbon solvents" Fuel, 1973, N. 02, vol. 52, p. 149-152.
Kemp, "Pinch Analysis and Process Integration, A User Guide on Process Integration for the Efficient Use of Energy", Second edition, Elsevier 2007.
Svreck et al "Successfully Specify Three-Phase Separators" Chemical Engineering Progress, Sep. 1994, p. 29-40.
Svreck et al. "Design Two-Phase Separators within the Right Limits" Chemical Engineering Progress, Oct. 1993, p. 53-60.
Fu et al."New technique for determination of diffusivities of volatile hydrocarbons in semi-solid bitumen", Fuel, 1979, vol. 58, August, pp. 557-560.
Kamoun et al."High Speed Shadowgraphy Investigations of Superheated Liquid Jet Atomization", ILASS-Americas 22nd Annual Conference on Liquid Atomization and Spray Systems, Cincinnati Ohio, May 2010.
Duan et al.'s "Numerical Analyses of Flashing Jet Structure and Droplet Size Characteristics"Journal of Nuclear Science and Technology, 2006, vol. 43, No. 3, p. 285-294.
Sou et al., "Effects of Cavitation in a Nozzle on liquid Jet atomization" International Journal of Heat and Mass Transfer; vol. 50, p. 3575-3582, 2007.
Ransom et al., "The relaps choke flow model and application to a large scale flow test", The American Society of Mechanical Engineers, Heat Transfer Division, 1980, Saratoga, New York.
Power,"Froth Treatment: Past, Present &Future" Oil Sand Symposium, University of Alberta, May 3-5, 2004.
Rahmani, "Shear-Induced Growth of Asphaltene Aggregates" Oil Sand Symposium, University of Alberta, May 4, 2004.
Paul et al. "Handbook of Industrial Mixing: Science and Practice" Wiley Interscience 2004, p. 391-477.
Blevins "Applied fluid dynamics handbook", Van Nostrand Reinhold Company 1984, p. 80-83.
Wu et al., "Experimental study on steam plume and temperature distribution for sonic jet" J. Phys.: Conf.Ser. 147 2009, 012079.
Yeon et al., "An Experimental Investigation of Direct Condensation of Steam Jet in Subcooled Water" Journal of Korean Nuclear Society vol. 29, No. 1, pp. 45-57, Feb. 1997.
Long et al., "Structure of water/solids/asphaltenes aggregates and effect of mixing temperature on settling rate in solvent-diluted bitumen" Fuel 2004, vol. 83, p. 823-832.
Rahimi et al., "Partial Upgrading of Athabasca Bitumen Froth by Asphaltene Removal", Unitar International Conference on Heavy Crude and Tar Sande, No. 1998.074, p. 1-8.
Hoehenberger, "Water Treatment, Cycle Chemistry, Boiler Operation and Related Problems/Failures on Steam Generator Systems > 30 bar", TÜV SÜD Industry Services, 2006, p. 1-14.
Schroyer, "Understand the Basics of Steam Injection Heating", Chemical Engineering Progress, Hydro-Thermal Corporation, May 1997, p. 1-4.
Prosonix, "PSX Steam Jet Diffuser . . . Technology That Makes a Difference", PSX Jet Diffuser Feb. 9, 2011.
Prosonix, "ProSonix Technical Bulletin", TB-4 Liquid & Steam Pressure Relationship.
Prosonix, "PSX Technical Bulletin", TB-7 Internally Modulated Steam Control 0210.
Prosonix, "Sparging Efficiency vs. Direct Steam Injection", TB-6 Sparging Efficiency & Performance Dec. 10, 2010.
Siemens, "Pictures of the Future", Spring 2006, Power Plants—Siemens Global Website, http://www.siemens.com/innovation/en/publikationen/publications_pof/pof_spring_2006/infrastructures_articles/power_plants.htm.
George, "Mining for Oil", Scientific American, Mar. 1998, p. 84-85.
Speight, "Deasphalting and Dewaxing Processes", The Chemistry and Technology of Petroleum, Fourth Edition, Chapter 19, CRC Press 2006.
Jeribi et al., "Adsorption Kinetics of Asphaltenes at Liquid Interfaces", Journal of Colloid and Interface Science, vol. 256, Issue 2, Dec. 15, 2002, pp. 268-272.
Branan, "Pocket Guide to Chemical Engineering" Elsevier Science & Technology Books, Nov. 1999.
Perry, "Perry's Chemical Engineers' Handbook" (7th Ed.), 1997.
Clarke et al., "Asphaltenes precipitation from Cold Lake and Athabasca bitumens", Petroleum Science and Technology, 1998, 16:3-4, p. 287-305.

(56) References Cited

OTHER PUBLICATIONS

Al-Atar, "Effect of Oil Compatibility and Resins/Asphaltenes Ratio on Heat Exchanger Fouling of Mixtures Containing Heavy Oil", Master Degree Thesis report, The University of British Columbia, Feb. 2000.
Gearhart, "Rose® process offers energy savings for solvent extraction", Proceedings from the Fifth Industrial Energy Technology Conference vol. II, Houston, TX, Apr. 17-20, 1983, p. 823-835.
Clarke et al., "Asphaltene precipitation: detection using heat transfer analysis, and inhibition using chemical additives" Fuel, vol. 76, Issue 7, May 1997, p. 607-614.
Shell Canada Limited, Application for Approval of the Jackpine Mine-Phase 1, ERCB application No. 1271285, May 2002.
Imperial Oil Ressources Ventures Limited, Application for the Imperial Oil Resources Ventures Limited (Imperial Oil) and ExxonMobil Canada Properties (ExxonMobil Canada) Kearl Oil Sands Project—Mine Development (Kearl Project), ERCB Application No. 1408771, Jul. 12, 2005.
Shell Canada Limited, Application for the Approval of Muskeg River Mine Project, ERCB Application No. 970588, Dec. 19, 1997.
Beckman Coulter, Particle Size and Size Distribution Analysis, Coulter Counter.com, pp. 1-3.
Outokumpu Technology, Slurry particle size analyzer, PSI 200 TM, 2006, pp. 1-8.
Johnson, Particle size distribution in clays, Clays and Clay Minerals, pp. 89-91.
Buckley et al., Solubility of the Least-Soluble Asphaltenes, Asphaltenes, Heavy Oils, and Petroleomics, Springer, 2007, Chapter 16, pp. 401-437.
Gerson et al., The Relation of Surfactant Properties to the Extraction of Bitumen from Athabasca Tar Sand by a Solvent-Aqueous-Surfactant Process, Chemistry for Energy, American Chemical Society, 1979, Chapter 6, pp. 66-79.
Nour et al., Characterization and Demulsification of Water-in-crude Oil Emulsions, Journal of Applied Sciences, vol. 7, issue 10, 2007, pp. 1437-1441.
Malcolmson et al., In-Line Particle Size Measurements for Cement and Other Abrasive Process Environments, for Presentation at the IEEE/PCA 40th Cement Industry Technical Conference, 1998, pp. 1-13.
A John Brooks Website, Spraying pumping filtering, Automated Retractable Nozzle System, FluidHandlingSolutions.com.
Liang et al., "Experimental and Analytical Study of Direct Contact Condensation of Steam in Water" Nucl. Eng. Des., 147, Issue 3, Apr. 1994, pp. 425-435.
Peramanu et al., "Flow loop apparatus to study the effect of solvent, temperature and additives on asphaltene precipitation" Journal of Petroleum Science and Engineering, vol. 23, Issue 2, Aug. 1999, pp. 133-143.
Parkash, "Refining Processes Handbook", 4th edition, Elsevier 2003.
Bui et al., "Modelling of Viscous Resuspension Using a One-Field Description of Multiphase Flows", Third International Conference on CFD in the Minerals and Process Industries, 2003 pp. 265-268.
Dispersion Technology, Inc., "Model DT-1201 . . . Acoustic and electro-acoustic spectrometer", Particle size and zeta potential measurement.
Csiro Minerals, UltraPS—Ultrasonic Particle Size Analyser, www.minerals.csiro.au.
Wedd, "Determination of Particle Size Distributions Using Laser Diffraction", Educ.Reso. for Part. Techn. 032Q-Wedd, pp. 1-4.
Rahmani et al., "Settling Properties of of Asphaltene Aggregates", Abstract, Energy Fuels, 2005, 19 (3), pp. 1099-1108.
Rahmani et al., "Fractal structure of asphaltene aggregates", Abstract, Journal of Colloid and Interface Science, vol. 285, Issue 2, May 15, 2005, pp. 599-608.
William L. Luyben, "Heat-Exchanger Bypass Control", Ind. Eng. Chem. Res. 2011, 50, 965-973.
Dutta-B, "Principles of Mass Transfer and Separation Processes", p. 344, 2009.
Schaschke, Carl. (2014). Dictionary of Chemical Engineering. Oxford University Press. p. 67. Online version available at:http://app.knovel.com/hotlink/toc/id:kpDCE00021/dictionary-chemical-engineering/dictionary-chemical-engineering.
Imran Ali, "Process Heating by Direct Steam Injection", Pharmaceutical Guide; Dec. 2010.
Choung, J. et al., "Effect of Temperature on the Stability of Froth Formed in the Recycle Process Water of Oil Sands Extraction", The Canadian Journal of Chemical Engineering, vol. 82, Aug. 2004, pp. 801-806.
Wiwchar, K. et al., "Column flotation in an oilsand application", Proceedings 36th Annual Meeting of the Canadian Mineral Processors, Ottawa, Ontario, Canada, Jan. 20-22, 2004.
Cleyle, P. et al., "Column Flotation Testing at Suncor Energy Inc.", Oilsand 2006 Conference, CD, University of Alberta, Feb. 22-24, 2006.
Finch, J. et al. "Column Flotation", 1st ed. Pergamon Press, 1990, pp. 1-7, 75-79, 82-89, 148-149, 152-159.
Baczek, "Paste Thickening Design Evolving to Higher Capacities and Efficiencies", International Minimizing Supplement to Paste Tailing Management, Mar. 2007. 16 pages.
Versteeg et al., "An Introduction to Computational Fluid Dynamics: the Finite Volume Method", 2nd Edition, Pearson Prentice Hall, First published 1995 and 2nd Edition published 2007, pp. 9, 33-77, 88-97, 78-87, 98-114, 115, 131-133, 156-164, 186-196, 256-264.
Ferziger et al., "Computational Methods for Fluid Dynamics", 3rd Edition, Springer, 2002, pp, 142-151, 188-206, 226-245, 265-307, 324-328.
Hobbs, D.M., "Optimization of a static mixer using dynamical systems techniques", published 1998, Elsevier Science, Chemical Engineering, vol. 53, No. 18, pp. 3199-3213.
Godard, et al., "A Review of Suncor Energy's Millennium Extraction Process", Proceedings 36th Annual Meeting of the Canadian Mineral Processors, pp. 141-152 (2004).
Mankowski et al., "Syncrude's Low Energy Extraction Process: Commercial Implementation", Proceedings 31st Annual Meeting of the Canadian Mineral Processors, pp. 154-181 (1999).
"Choked Flow of Gases", O'Keefe Controls Co., pp. 38, 16-18 (2000).

* cited by examiner

PROCESS FOR TREATING HIGH PARAFFIN DILUTED BITUMEN

FIELD OF THE INVENTION

The present invention generally relates to oil sands bitumen froth processing and more specifically to treating high paraffin diluted bitumen in a paraffinic froth treatment process.

BACKGROUND

In a paraffinic froth treatment (PFT) process, bitumen froth is mixed with paraffinic solvent and separated into an underflow component containing precipitated asphaltenes, water, fine solids and residual paraffin and bitumen, and an overflow component which may be referred to as high diluted bitumen. This high diluted bitumen contains paraffinic solvent and water, which it is desirable to remove in order to produce dry bitumen for upgrading or pipelining to other markets.

More particularly, the production of dry bitumen from a PFT process requires removal of high quantities of paraffinic solvent from the high diluted bitumen containing asphaltenes at the precipitation/solubility limit as well as water largely dissolved in the hydrocarbon phase.

Conventional solutions for treating the high diluted bitumen adapt diluent recovery processes that were developed and applied in conventional naphthenic froth treatment processing, for use in paraffinic froth treatment. These processes involve heating, stage flashing and fractionate to recover diluent and feed downstream upgrading operations such as vacuum fractionation of a gas oil product or coking or hydrocracking. These downstream upgrading operations require high feed temperatures.

The high diluted high bitumen produced by PFT differs from diluted bitumen from conventional naphthenic froth treatment. First, conventional froth treatment produces a diluted bitumen product with diluent/bitumen (D/B) ratios on a wt/wt basis of 0.45 to 0.8. Single stage flash vessels are typically used to reduce diluent to levels acceptable for subsequent processing and fractionation. For paraffinic froth treatment, the diluted bitumen product has D/B ratios ranging from 1.2 to 2.5 wt/wt and is termed high diluted bitumen. As flash vessel sizing to minimize entrainment and carry-over of feed droplets depends directly on the vapour velocity, the high diluent loads in high diluted bitumen derived from PFT require large diameter flash vessels. Secondly, in PFT, high diluted bitumen contains asphaltenes in equilibrium with the paraffinic solvent at the temperature and, to a lesser extent, the pressure of the froth settling vessel from which it overflows. To flash diluent requires inputting heat to the stream. However, the solubility of asphaltenes in paraffinic solutions does not increase linearly with temperature. Consequently as the stream is heated, asphaltenes precipitate from saturated solutions causing equipment to foul. The asphaltene fouled equipment normally must be removed from service for cleaning and restoration of equipment performance. Third, the limited understanding of the equilibrium between paraffinic solvents and entrained bitumen with asphaltenes has limited enhanced design and operation of solvent recovery processes for high diluted bitumen. At high solvent concentrations in overhead systems, asphaltenes in bitumen entrained from flash separators precipitate and foul piping and equipment. At high solvent recoveries, the maltene fraction of the bitumen can selectively accumulate in the solvent and adversely affect the separation of bitumen from bitumen froth. Conventional techniques have not been able to minimize entrainment for reliable plant operation. Fourthly, process temperatures in diluent recovery plants for conventional froth treatment process are 200° C. to 275° C. for atmospheric flashing (100-200 kPa) to separate naphtha diluent from diluted bitumen. At these operating conditions, water in naphtha diluted bitumen flashes and is condensed for separation in the overhead diluent separator. The diluent solvents used in PFT are more volatile and, consequently, can separate from bitumen at lower process temperatures. The lower energy requirement for these temperatures is constrained by water flashing and condensing within a similar pressure and temperature, resulting in unstable separation in column operations. Fifthly, unit operations have viewed the froth treatment separation as distinct and separate from diluent recovery plant with surge tankage between unit operations. To provide for surge capacity between the unit operations the tankage has been large. Also, limiting emissions by the volatile diluent solvent have required cooling run down streams to tankage and heating return fluids to the process temperature from tankage. Sixthly, process equipment for heating the diluted bitumen conventionally has not had to deal with large vapour loads, as the naphthenic diluent has a large boiling point range and the diluent recovered is lower in ratio to the bitumen processed. The paraffinic process has larger vapour loads and has a very narrow boiling point.

As more general background on PFT in the context of oil sands processing, extraction processes are used to liberate and separate bitumen from oil sand so the bitumen can be further processed. Numerous oil sand extraction processes have been developed and commercialized using water as a processing medium. One such water extraction process is the Clarke hot water extraction process, which recovers the bitumen product in the form of a bitumen froth stream. The bitumen froth stream produced by the Clarke hot water process contains water in the range of 20 to 45%, more typically 30% by weight and minerals from 5 to 25%, more typically 10% by weight which must be reduced to levels acceptable for downstream processes. At Clarke hot water process temperatures ranging from 40 to 80° C., bitumen in bitumen froth is both viscous and has a density similar to water. To permit separation by gravitational separation processes, commercial froth treatment processes involve the addition of a diluent to facilitate the separation of the diluted hydrocarbon phase from the water and minerals. Initial commercial froth treatment processes utilized a hydrocarbon diluent in the boiling range of 76-230° C. commonly referred to as a naphtha diluent in a two stage centrifuging separation process. Limited unit capacity, capital and operational costs associated with centrifuges promoted applying alternate separation equipment for processing diluted bitumen froth. In these processes, the diluent naphtha was blended with the bitumen froth at a weight ratio of diluent to bitumen (D/B) in the range of 0.3 to 1.0 and produced a diluted bitumen product with typically less than 4 weight percent water and 1 weight percent mineral which was suitable for dedicated bitumen upgrading processes. Generally, operating temperatures for these processes were specified such that diluted froth separation vessels were low pressure vessels with pressure ratings less than 105 kPag. Other froth separation processes using naphtha diluent involve operating temperatures that require froth separation vessels rated for pressures up to 5000 kPag. Using conventional vessel sizing methods, the cost of pressure vessels and associated systems designed for and operated at this high pressure limits the commercial viability of these processes.

Heavy oils such as bitumen are sometimes described in terms of relative solubility as comprising a pentane soluble fraction which, except for higher molecular weight and boiling point, resembles a distillate oil; a less soluble resin fraction; and a paraffinic insoluble asphaltene fraction characterized as high molecular weight organic compounds with sulphur, nitrogen, oxygen and metals that are often poisonous to catalysts used in heavy oil upgrading processes. Paraffinic hydrocarbons can precipitate asphaltenes from heavy oils to produce deasphalted heavy oil with contaminate levels acceptable for subsequent downstream upgrading processes. Contaminants tend to follow the asphaltenes when the asphaltenes are precipitated by paraffinic solvents having compositions from $C_3$ to $C_{10}$ when the heavy oil is diluted with about 2 to 10 times the volume of solvent.

High water and mineral content distinguish bitumen froth from the heavy oil deasphalted in the above processes. Some early attempts to adapt deasphalting operations to processing bitumen from oil sands effected precipitation of essentially a mineral free, deasphalted product, the ability to vary the amount of asphaltene precipitated, and the enhancement of asphaltene precipitation by addition of water and chemical agents.

Recent investigations and developed techniques in treating bitumen froth with paraffinic use froth settling vessels (FSV) arranged in a counter-current flow configuration. In process configurations, counter-current flow refers to a processing scheme where a process medium is added to a stage in the process to extract a component in the feed to that stage, and the medium with the extracted component is blended into the feed of the preceding stage. Counter-current flow configurations are widely applied in process operations to achieve both product quality specifications and optimal recovery of a component with the number of stages dependent on the interaction between the desired component in the feed stream and the selected medium, and the efficiency of stage separations. In deasphalting operations processing heavy oil with low mineral solids, separation using counter-current flow can be achieved within a single separation vessel. However, rapidly setting mineral particles in bitumen froth preclude using a single separation vessel as this material tends to foul the internals of conventional deasphalting vessels.

A two stage paraffinic froth treatment process is disclosed in Canadian Patent No. 2,454,942 (Hyndman et al.) and represented in its FIG. 1 as a froth separation plant. In a froth separation plant, bitumen froth at 80-95° C. is mixed with overflow product from the second stage settler such that the solvent to bitumen ratio in the diluted froth stream is above the threshold to precipitate asphaltenes from the bitumen froth. For paraffinic froth treatment processes with pentane as the paraffinic solvent, the threshold solvent to bitumen ratio as known in the art is about 1.2 which significantly increases the feed volume to the settler. The first stage settler separates the diluted froth into a high dilute bitumen stream comprising a partially to fully deasphalted diluted bitumen with a low water and mineral content, and an underflow stream containing the rejected asphaltenes, water, and minerals together with residual maltenes from the bitumen feed and solvent due to the stage efficiency. The first stage underflow stream is mixed with hot recycled solvent to form a diluted feed for the second stage settler. The second stage settler recovers residual maltenes and solvent to the overflow stream returned to the first stage vessel and froth separation tailings. It is important to recognize the different process functions of stages in a counter-current process configuration. In this case, the operation of first stage settler focuses on product quality and the second stage settler focuses on recovery of residual hydrocarbon from the underflow of the first stage settler.

The process may be operated at temperatures that require controlling the pressure in either settler stage to limit solvent vaporization. The concentration of solvent in diluted bitumen and temperature for a specific paraffinic solvent such as pentane determine the solubility and hence the rejection of asphaltenes. While low asphaltene rejection maximizes bitumen recovery, the asphaltene content may limit processing options in upgrading operations particularity those based on hydrogen addition.

The diluent recovery from diluted bitumen produced by conventional froth treatment closely resembles conventional crude oil distillation (see for example Andrews et al. "*Great Canadian Oil Sands Experience in Commercial Processing of Athabasca Tar Sands*" American Chemical Society San Francisco Meeting Apr. 2-5, 1968) in that diluent is recovered as an overhead product and the bitumen as a bottom product is fed to cokers at 260° C. for upgrading. Relative to diluted bitumen for conventional froth treatment, the conventional diluent recovery encounters a number of problems in processing high diluted bitumen produced by paraffinic froth treatment processes.

The naphtha diluents are composed of various hydrocarbons resulting in atmospheric pressure boiling temperatures ranging from 76° C. up to the initial boiling point of 230° C. for bitumen. With this boiling range, high diluent recoveries require high distillation temperatures for the diluent-bitumen separation. However, using a specific paraffinic solvent range of specific paraffins such as pentanes as a diluent have a narrow boiling range: pentanes for example boil at about 28-36° C. With this narrow boiling range, flashing of paraffinic diluent to the vapour phase is sensitive to variations in operating pressures and can result in excessive entrainment of bitumen droplets. In addition, the boiling point of water 100° C. is between the diluent and bitumen boiling ranges and can adversely affect the stability of the distillation in producing a dry bitumen product that can be marketed to upgraders remote to the froth treatment plant.

The naphtha diluents dilute bitumen to permit gravitational separations of water and mineral from the hydrocarbon phase without significant precipitation of asphaltenes. However, paraffinic froth treatment processes use paraffinic diluent to reject residual water and minerals with partial rejection of asphaltenes and produce high diluted bitumen comprising asphaltenes determined by operating temperature and the solvent to bitumen ratio in the froth separation vessel. The solubility of asphaltenes in high diluted bitumen creates two notable problems for diluent recovery. Firstly, the solubility of asphaltenes in high diluted bitumen depends on temperature and as temperature increases for distilling diluent, asphaltenes can precipitate with deposits fouling equipment. Secondly, bitumen droplets entrained into overhead diluent streams precipitate asphaltenes at the high paraffinic concentrations that foul overhead systems and the maltenes fraction of the bitumen adversely affect froth separation by increasing solubility of asphaltene.

Conventionally, diluent recovery has been viewed as part of conventional refining operation with some heat integrated across the refinery. Tankage between the froth treatment and diluent recovery can allow each operation to operate independently. However, paraffinic froth treatment operations may operate independently from refinery operations and, consequently, high levels of heat may be potentially lost from the paraffinic froth treatment process.

It is clear that the known techniques and methods of treating high diluted bitumen in a PFT process have several drawbacks and shortcomings.

SUMMARY OF THE INVENTION

The present invention overcomes at least some of the above-mentioned drawbacks or shortcomings by providing a process for treating high paraffin diluted bitumen.

In one embodiment, there is provided a paraffinic solvent recovery process for treating a high paraffin diluted bitumen containing bitumen and residual water, fine solids and asphaltenes, the high paraffin diluted bitumen being derived from a paraffinic froth separation operation that separates a bitumen froth into a solvent diluted tailings component and the high paraffin diluted bitumen, comprising supplying the high paraffin diluted bitumen to a paraffinic solvent flashing apparatus; separating the high paraffin diluted bitumen within the paraffinic solvent flashing apparatus into a flashed paraffinic solvent component and a diluted bitumen underflow component; and returning a portion of the diluted bitumen underflow component as a returned diluted bitumen component into the high paraffin diluted bitumen prior to introduction into the paraffinic solvent flashing apparatus, at a temperature and in an amount sufficient to shift asphaltene precipitation equilibrium so as to reduce asphaltene precipitation in the paraffinic solvent flashing apparatus.

In one optional aspect, the paraffinic solvent flashing apparatus comprises a first flash vessel for receiving the high paraffin diluted bitumen and producing a first flashed paraffinic solvent component and a first diluted bitumen underflow component; and a second flash vessel for receiving the first diluted bitumen underflow component and producing a second flashed paraffinic solvent component and a second diluted bitumen underflow component.

In another optional aspect, the returned diluted bitumen component comprises the first diluted bitumen underflow component.

In another optional aspect, the returned diluted bitumen component comprises the second diluted bitumen underflow component.

In another optional aspect, the returned diluted bitumen component is returned to feed the first flash vessel.

In another optional aspect, the returned diluted bitumen component is returned to feed the second flash vessel.

In another optional aspect, the paraffinic solvent flashing apparatus comprises inlet feed piping, outlet flash piping and outlet underflow piping.

In another optional aspect, the paraffinic solvent flashing apparatus comprises valves, pumps, monitoring devices, fittings or heat exchangers, or a combination thereof.

In another optional aspect, the process comprises heating the returned diluted bitumen component prior to feeding the paraffinic solvent flashing apparatus.

In another optional aspect, the process comprises imparting sufficient backpressure on the high paraffin diluted bitumen prior to introduction into the paraffinic solvent flashing apparatus to maintain the high paraffin diluted bitumen in liquid phase.

In another optional aspect, the backpressure is imparted by a valve or flow restriction.

In another optional aspect, the backpressure is imparted by a valve arranged downstream of the returning of the returned diluted bitumen component into the high paraffin diluted bitumen.

In another optional aspect, the process comprises pre-heating the high paraffin diluted bitumen prior to introduction into the paraffinic solvent flashing apparatus. The pre-heating of the high paraffin diluted bitumen may be at least partially performed by recovering heat from the flashed paraffinic solvent component. The pre-heating may be at least partially performed in at least one flashed paraffinic solvent heat exchanger and the process may comprise providing a bypass line for bypassing the flashed paraffinic solvent heat exchanger. The bypass line may allow bypassing the high paraffin diluted bitumen around the flashed paraffinic solvent heat exchanger.

In another optional aspect, the process comprises recovering a hot dry bitumen component from the diluted bitumen underflow component and wherein the pre-heating of the high paraffin diluted bitumen is at least partially performed by recovering heat from the hot dry bitumen component. In another optional aspect, the pre-heating is at least partially performed in at least one hot dry bitumen heat exchanger and the process comprises providing a bypass line for bypassing the hot dry bitumen heat exchanger. The bypass line may allow bypassing the hot dry bitumen component around the hot dry bitumen heat exchanger.

In another optional aspect, the process comprises a heat exchanger series to serially heat the high paraffin diluted bitumen, the heat exchanger series comprising: a downstream heat exchanger for transferring heat from a hot dry bitumen component to the high paraffin diluted bitumen, producing a partially cooled dry bitumen; an middle heat exchanger for transferring heat from the flashed paraffinic solvent component to the high paraffin diluted bitumen; and providing an upstream heat exchanger for transferring heat from the partially cooled dry bitumen to the high paraffin diluted bitumen.

In another optional aspect, the pre-heating of the high paraffin diluted bitumen is at least partially performed by passing the high paraffin diluted bitumen in a heat exchange line through an upper part of the paraffinic solvent flashing apparatus.

In another optional aspect, the paraffinic solvent comprises $C_4$ to $C_6$ paraffins. In another optional aspect, the paraffinic solvent has a boiling point range between varying by at most about 25° C. In another optional aspect, the paraffinic solvent comprises pentane. In another optional aspect, the paraffinic solvent consists essentially of pentane.

In another optional aspect, the process comprises temporary downtime operation comprising flowrate reduction of the high paraffin diluted bitumen; and flowrate augmentation of the returned diluted bitumen component sufficient to maintain circulation of fluids within the paraffinic solvent flashing apparatus.

The invention also provides a paraffinic solvent recovery process for treating a high paraffin diluted bitumen containing bitumen and residual water, fine solids and asphaltenes, the high paraffin diluted bitumen being derived from a paraffinic froth separation operation that separates a bitumen froth into a solvent diluted tailings component and the high paraffin diluted bitumen, comprising pre-heating the high paraffin diluted bitumen to produce a heated high paraffin diluted bitumen; supplying the heated high paraffin diluted bitumen to a paraffinic solvent flashing apparatus; separating the heated high paraffin diluted bitumen within the paraffinic solvent flashing apparatus into a flashed paraffinic solvent component and a diluted bitumen underflow component; deriving a hot dry bitumen from the diluted bitumen underflow component; wherein the pre-heating is performed by transferring heat to the high paraffin diluted bitumen from the hot dry bitumen, the flashed paraffinic solvent or a portion of the diluted bitumen underflow component, or a combination thereof.

In one optional aspect, the pre-heating of the high paraffin diluted bitumen is at least partially performed by recovering heat from the flashed paraffinic solvent component.

In another optional aspect, the pre-heating is at least partially performed in at least one flashed paraffinic solvent heat exchanger and the process comprises providing a bypass line for bypassing the flashed paraffinic solvent heat exchanger.

In another optional aspect, the bypass line allows bypassing the high paraffin diluted bitumen around the flashed paraffinic solvent heat exchanger.

In another optional aspect, the pre-heating of the high paraffin diluted bitumen is at least partially performed by recovering heat from the hot dry bitumen component.

In another optional aspect, the pre-heating is at least partially performed in at least one hot dry bitumen heat exchanger and the process comprises providing a bypass line for bypassing the hot dry bitumen heat exchanger.

In another optional aspect, the bypass line allows bypassing the hot dry bitumen component around the hot dry bitumen heat exchanger.

In another optional aspect, the process comprises a heat exchanger series to serially heat the high paraffin diluted bitumen, the heat exchanger series comprising: a downstream heat exchanger for transferring heat from the hot dry bitumen component to the high paraffin diluted bitumen, producing a partially cooled dry bitumen; an middle heat exchanger for transferring heat from the flashed paraffinic solvent component to the high paraffin diluted bitumen; and providing an upstream heat exchanger for transferring heat from the partially cooled dry bitumen to the high paraffin diluted bitumen.

In another optional aspect, the pre-heating of the high paraffin diluted bitumen is at least partially performed by passing the high paraffin diluted bitumen in a heat exchange line through an upper part of the paraffinic solvent flashing apparatus.

In another optional aspect, the pre-heating is at least partially performed by transferring heat to the high paraffin diluted bitumen from the portion of the diluted bitumen underflow component.

In another optional aspect, the process comprises returning a portion of the diluted bitumen underflow component as a returned diluted bitumen component into the high paraffin diluted bitumen prior to introduction into the paraffinic solvent flashing apparatus, at a temperature and in an amount sufficient to shift asphaltene precipitation equilibrium so as to reduce asphaltene precipitation in the paraffinic solvent flashing apparatus.

In another optional aspect, the process comprises heating the returned diluted bitumen component prior to mixing into the high paraffin diluted bitumen.

In another optional aspect, the paraffinic solvent flashing apparatus comprises a first flash vessel for receiving the high paraffin diluted bitumen and producing a first flashed paraffinic solvent component and a first diluted bitumen underflow component; and a second flash vessel for receiving the first diluted bitumen underflow component and producing a second flashed paraffinic solvent component and a second diluted bitumen underflow component; wherein the first diluted bitumen underflow component is returned into the high paraffin diluted bitumen to pre-heat the same.

In another optional aspect, the process comprises imparting sufficient backpressure on the high paraffin diluted bitumen prior to introduction into the paraffinic solvent flashing apparatus to maintain the high paraffin diluted bitumen in liquid phase.

In another optional aspect, the backpressure is imparted by a valve or flow restriction.

In another optional aspect, the backpressure is imparted by a valve arranged downstream of all of the pre-heating of the high paraffin diluted bitumen.

In another optional aspect, the paraffinic solvent comprises $C_4$ to $C_6$ paraffins. In another optional aspect, the paraffinic solvent has a boiling point range between varying by at most about 25° C. In another optional aspect, the paraffinic solvent comprises pentane. In another optional aspect, the paraffinic solvent consists essentially of pentane.

The invention also provides a paraffinic solvent recovery process for treating a high paraffin diluted bitumen containing bitumen and residual water, fine solids and asphaltenes, the high paraffin diluted bitumen being derived from a paraffinic froth separation operation that separates a bitumen froth into a solvent diluted tailings component and the high paraffin diluted bitumen using a given solvent-to-bitumen ratio range to precipitate a given concentration range of asphaltenes, comprising: supplying the high paraffin diluted bitumen to a paraffinic solvent flashing apparatus; separating the high paraffin diluted bitumen within the paraffinic solvent flashing apparatus into a flashed paraffinic solvent component and a diluted bitumen underflow component, wherein the flashed paraffinic solvent component contains residual light end bitumen contaminants that increase solubility of asphaltenes; removing a portion of the residual light end bitumen contaminants from the flashed paraffinic solvent component to produce a recovered paraffinic solvent with sufficiently low amount of the residual light end bitumen contaminants so as to be reused in the paraffinic froth separation operation at the given solvent-to-bitumen ratio range to maintain precipitation of the given concentration range of asphaltenes.

In another optional aspect, the removing of the contaminants comprises refluxing in the paraffinic solvent flashing apparatus.

In another optional aspect, the removing of the contaminants comprises providing internals in an upper section of the paraffinic solvent flashing apparatus. The internals may comprise packing. The internals may comprise at least one tray.

In another optional aspect, the removing of the contaminants comprises cooling the flashed paraffinic solvent component sufficiently to produce flash vapour solvent condensate; and separating the flash vapour solvent condensate in a secondary flash vessel to produce a secondary flash solvent condensate containing the contaminants and secondary flash solvent vapour.

In another optional aspect, the process comprises feeding at least a portion of the secondary flash solvent condensate into a fractionation column to recover paraffinic solvent fraction therefrom and allow the contaminants to be removed in a separate fraction.

In another optional aspect, the process comprises recycling at least a portion of the secondary flash solvent condensate as recycled flash solvent condensate back into the secondary flash vessel.

In another optional aspect, the secondary flash vessel comprises a flash drum.

In another optional aspect, the process comprises pre-heating the high paraffin diluted bitumen to produce a heated high paraffin diluted bitumen prior to introduction into the paraffinic solvent flashing apparatus.

In another optional aspect, the pre-heating comprises transferring heat to the high paraffin diluted bitumen from the flashed paraffinic solvent.

In another optional aspect, the process comprises managing the pre-heating and corresponding cooling of the flashed paraffinic solvent component to promote downstream separation of contaminants from the flashed paraffinic solvent component.

In another optional aspect, the pre-heating comprises transferring heat to the high paraffin diluted bitumen from hot dry bitumen or a portion of diluted bitumen underflow component from the paraffinic solvent flashing apparatus or a combination thereof.

In another optional aspect, the process comprises cooling the secondary flash solvent vapour to produce a cooled secondary flash vapour.

In another optional aspect, the process comprises condensing the cooled secondary flash vapour to produce a recovered flash paraffinic solvent and vent gas.

In another optional aspect, the process comprises supplying the secondary flash solvent condensate to a bitumen fractionation column and recovering a recovered column paraffinic solvent therefrom.

In another optional aspect, the process comprises supplying the secondary flash solvent condensate, a portion of the flashed paraffinic solvent component and the diluted bitumen underflow component to the bitumen fractionation column; withdrawing at least hot dry bitumen underflow and column overhead vapour from the bitumen fractionation column; and recovering paraffinic solvent from the column overhead vapour as a recovered column paraffinic solvent.

In another optional aspect, the process comprises withdrawing column water from the bitumen fractionation column and combining the column water with the column overhead vapour in a column separator to produce the recovered column paraffinic solvent and recovered water.

In another optional aspect, the secondary flash vessel comprises packing.

In another optional aspect, the secondary flash vessel comprises at least one tray.

In another optional aspect, the secondary flash vessel is operated under reflux conditions.

In another optional aspect, the process comprises identifying the residual light end bitumen contaminants that increase the solubility of the asphaltenes.

In another optional aspect, the identifying comprises measuring, detecting or monitoring.

In another optional aspect, the identifying comprises estimating or modelling.

In another optional aspect, the residual light end bitumen contaminants are identified as comprising aromatic contaminants. The aromatic contaminants may comprise toluene, benzene, o-xylene, m-xylene, p-xylene, ethylbenzene, n-propylbenzene, isopropylbenzene, n-butylbenzene, isobutylbenzene, s-butylbenzene, t-butylbenzene, tetralin, nonylbenzene or decylbenzene or a combination thereof. The aromatic contaminants may comprise toluene.

In another optional aspect, the removing is conducted such that the aromatic contaminants are present in the recovered paraffinic solvent at a concentration below about 5000 wppm toluene equivalent.

In another optional aspect, the removing is conducted such that the aromatic contaminants are present in the recovered paraffinic solvent at a concentration below about 800 wppm toluene equivalent.

In another optional aspect, the residual light end bitumen contaminants are identified as comprising alkane contaminants. In another optional aspect, the alkane contaminants comprise cycloparaffins. In another optional aspect, the cycloparaffins comprise cyclopentane, methylcyclopentane, ethylcyclopentane, cyclohexane, methylcyclohexane, ethylcyclohexane or decalin or a combination thereof.

In another optional aspect, the residual light end bitumen contaminants are identified as comprising cycloalkene contaminants.

In another optional aspect, the residual light end bitumen contaminants are identified as comprising solvent contaminants comprising pyridine, nitrobenzene, methylene dichloride, chloroform or carbon tetrachloride or a combination thereof.

In another optional aspect, the residual light end bitumen contaminants are identified as comprising nitrogen-containing aromatic compounds.

In another optional aspect, the paraffinic solvent comprises $C_4$ to $C_6$ paraffins. In another optional aspect, the paraffinic solvent has a boiling point range between varying by at most about 25° C. In another optional aspect, the paraffinic solvent comprises pentane. In another optional aspect, the paraffinic solvent consists essentially of pentane.

In another optional aspect, the removing of the contaminants is performed so as to obtain the recovered paraffinic solvent having a solubility parameter $\delta=\gamma V^{-1/3}$ of less than 4 at 25° C. or an equivalent adjusted for temperature.

In another optional aspect, the solubility parameter equivalent is adjusted for temperatures between about 70° C. and about 90° C.

The invention also provides a paraffinic solvent recovery process for treating a high paraffin diluted bitumen containing bitumen and residual water, fine solids and asphaltenes, the high paraffin diluted bitumen being derived from a paraffinic froth separation operation that separates a bitumen froth into a solvent diluted tailings component and the high paraffin diluted bitumen, comprising supplying the high paraffin diluted bitumen to a paraffinic solvent flashing apparatus comprising a first flash vessel for receiving the high paraffin diluted bitumen and producing a first flashed paraffinic solvent component and a first diluted bitumen underflow component; and a second flash vessel for receiving the first diluted bitumen underflow component and producing a second flashed paraffinic solvent component and a second diluted bitumen underflow component; providing a bitumen fractionation column having an upper portion, an intermediate portion and a lower portion; supplying at least a portion of the second diluted bitumen underflow component to the lower portion of the bitumen fractionation column; supplying at least a portion of the second flashed paraffinic solvent to the intermediate portion of the bitumen fractionation column; supplying at least a portion of the first flashed paraffinic solvent to the upper portion of the bitumen fractionation column; and withdrawing from the bitumen fractionation column a hot dry bitumen underflow containing at most 0.5 wt % paraffinic solvent and a column overhead vapour.

In another optional aspect, the process comprises pre-treating the first flashed paraffinic solvent prior to introduction into the upper portion of the bitumen fractionation column, the pre-treating comprising cooling the first flashed paraffinic solvent component; separating the first flashed paraffinic solvent component in a secondary flash vessel to produce a secondary flash solvent condensate and secondary flash solvent vapour; and introducing the secondary flash solvent condensate into the upper portion of the bitumen fractionation column.

In another optional aspect, the process comprises pre-heating the second diluted bitumen underflow component prior to introduction into the lower portion of the bitumen fractionation column.

In another optional aspect, the process comprises withdrawing column water from the bitumen fractionation column.

In another optional aspect, the process comprises withdrawing of the column water is from the intermediate portion of the bitumen fractionation column.

In another optional aspect, the process comprises the column water with the column overhead vapour in a column separator to produce recovered column paraffinic solvent and recovered water.

In another optional aspect, the process comprises recycling a portion of the recovered column paraffinic solvent as column reflux back into the upper portion of the bitumen fractionation column.

In another optional aspect, the process comprises pre-heating the high paraffin diluted bitumen to produce a heated high paraffin diluted bitumen prior to introduction into the first flash vessel, wherein the pre-heating is performed by transferring heat to the high paraffin diluted bitumen from the hot dry bitumen, the first flashed paraffinic solvent or a portion of the first diluted bitumen underflow component, or a combination thereof.

In another optional aspect, the process comprises returning a portion of the first diluted bitumen underflow component as a returned diluted bitumen component into the high paraffin diluted bitumen prior to introduction into the first flash vessel, at a temperature and in an amount sufficient to shift asphaltene precipitation equilibrium so as to reduce asphaltene precipitation in the paraffinic solvent flashing apparatus.

In another optional aspect, the paraffinic solvent flashing apparatus comprises inlet feed piping, outlet flash piping and outlet underflow piping.

In another optional aspect, the paraffinic solvent flashing apparatus comprises valves, pumps, monitoring devices, fittings or heat exchangers, or a combination thereof.

In another optional aspect, the process comprises removing a portion of residual light end bitumen contaminants that increase solubility of asphaltenes from the flashed paraffinic solvent component to produce a recovered paraffinic solvent with sufficiently low amount of the residual light end bitumen contaminants so as to be reused in the paraffinic froth separation operation at a given solvent-to-bitumen ratio range to maintain precipitation of a given concentration range of asphaltenes.

In another optional aspect, the removing of the contaminants comprises refluxing in the paraffinic solvent flashing apparatus.

In another optional aspect, the removing of the contaminants comprises providing internals in an upper section of the first solvent flash apparatus. The internals may comprise packing. The internals may comprise at least one tray.

In another optional aspect, the removing of the contaminants comprises cooling the first flashed paraffinic solvent component and separating the first flash vapour solvent condensate in the secondary flash vessel to produce the secondary flash solvent condensate containing the contaminants and secondary flash solvent vapour.

In another optional aspect, the secondary flash vessel comprises packing.

In another optional aspect, the secondary flash vessel comprises at least one tray.

In another optional aspect, the secondary flash vessel is operated under reflux conditions.

In another optional aspect, the process comprises regulating the removing of the contaminants upstream of the bitumen fractionation column in order to reduce loading of the contaminants in the upper portion of the bitumen fractionation column.

In another optional aspect, the paraffinic solvent comprises $C_4$ to $C_6$ paraffins. In another optional aspect, the paraffinic solvent has a boiling point range between varying by at most about 25° C. In another optional aspect, the paraffinic solvent comprises pentane. In another optional aspect, the paraffinic solvent consists essentially of pentane.

In another optional aspect, the hot dry bitumen underflow containing at most 0.1 wt % paraffinic solvent.

DETAILED DESCRIPTION

Figure 1:
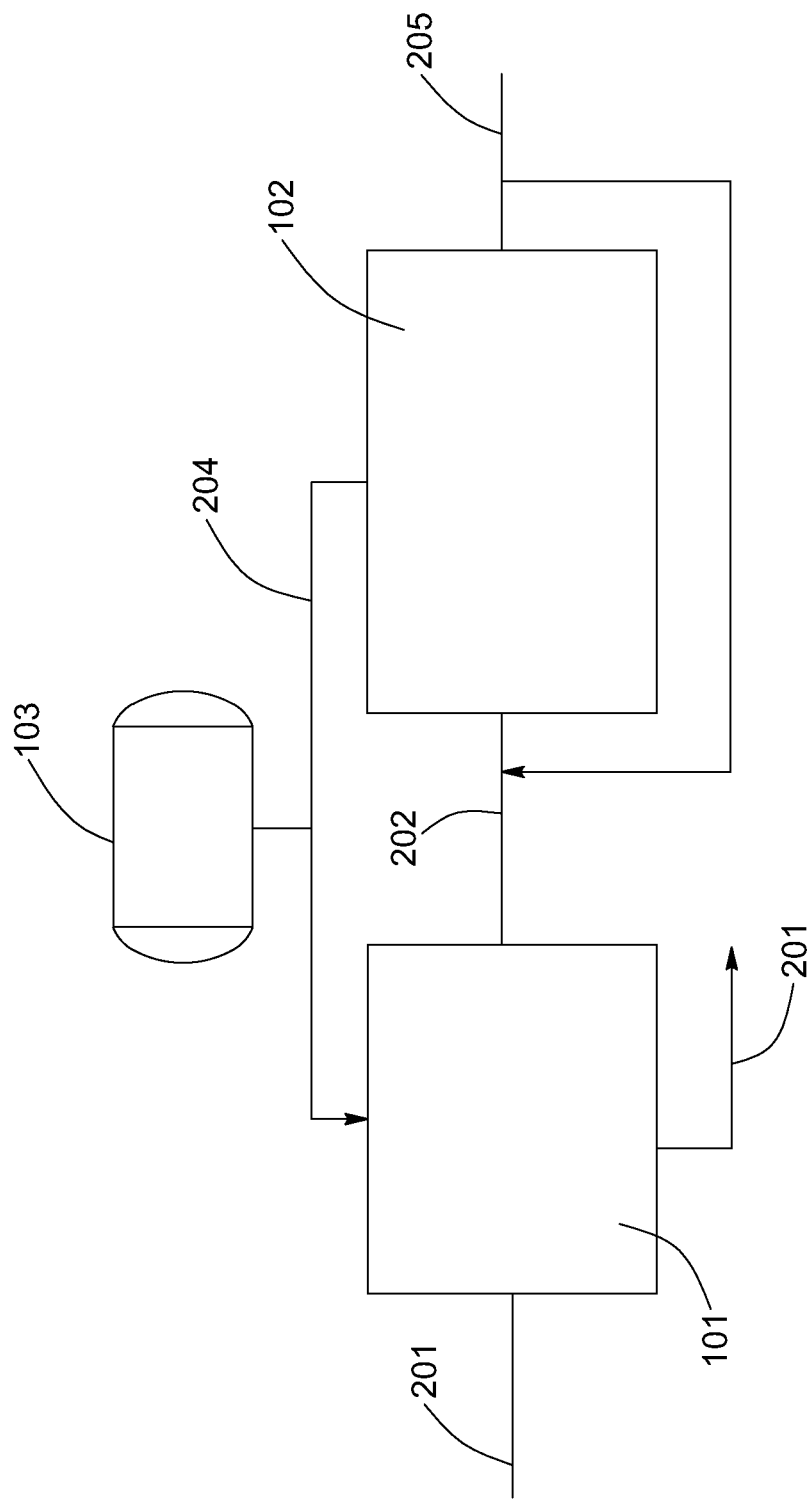
FIG. 1 is a block flow plan illustrating a froth treatment separation and diluent recovery according to an embodiment of the present invention.
Figure 2:
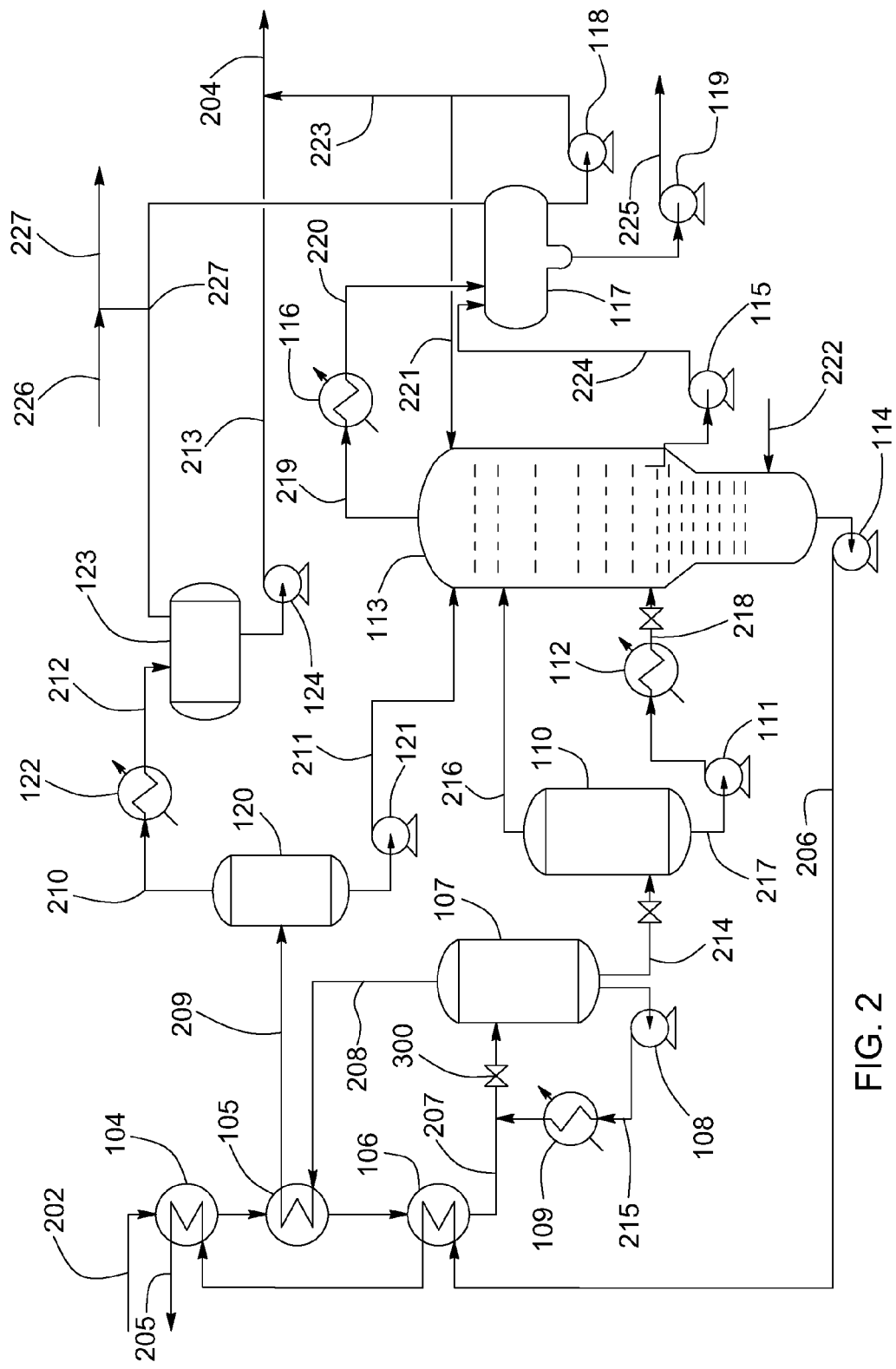
FIG. 2 is a block flow plan illustrating a diluent recovery operation according to an embodiment of the present invention.

Referring to FIGS. 1 and 2, the following is a parts list for elements illustrated therein:
Equipment/Plant:
101 Froth Separation Plant
102 Solvent Recovery Plant
103 Hot Diluent Storage
104 Feed/Bitumen Product Heat Exchanger
105 Feed/Flash Heat Exchanger
106 Feed/Bitumen Product Heat Exchanger
107 Flash Vessel
108 Flash Vessel Recycle Pump
109 Flash Vessel Feed Heater
110 Flash Vessel #2
111 Bitumen Column Feed Pump
112 Bitumen Column Feed Heater
113 Bitumen Column
114 Bitumen Product Pump
115 Water Draw Off Pump
116 Column Condenser
117 Column Separator
118 Column Solvent Pump
119 Recovered Water Pump
120 Flash Solvent Drum
121 Flash Solvent Pump
122 Flash Solvent Condenser
123 Condensed Solvent Drum
124 Condensed Solvent Pump Lines and Valves:
201 Bitumen Froth
202 High Diluted Bitumen
203 Froth Separation Tailings
204 Hot Recycled Solvent
205 Dry Bitumen
206 Hot Dry Bitumen
207 Hot High Diluted Bitumen
208 Flashed Solvent Vapor
209 Flashed Solvent Condensate
210 Flash Solvent Drum Vapor
211 Flash Solvent Drum Condensate
212 Cooled Flash Vapor
213 Recovered Flash Solvent
214 Diluted Bitumen
215 Diluted Bitumen Recycle
216 Flash #2 Vapor
217 Flash #2 Diluted Bitumen
218 Bitumen Column Feed
219 Column Overhead Vapor
220 Cooled Overhead Vapor
221 Column Reflux
222 Column Stripping Steam! Gas
223 Recovered Column Solvent
224 Column Water
225 Recovered Water
226 Inert Purge Gas
227 Vent Gas
300 Feed backpressure valve
301a Feed/Bitumen Product Heat Exchanger bitumen bypass valve
301b Feed/Bitumen Product Heat Exchanger feed bypass valve
302a Feed/Flash Heat Exchanger feed bypass valve
302b Feed/Flash Heat Exchanger flash bypass valve
303a Feed/Bitumen Product Heat Exchanger bitumen bypass valve
303b Feed/Bitumen Product Heat Exchanger feed bypass valve
304 Hot Dry Bitumen recycle valve
306 Solvent Drum recycle valve Referring to FIG. 1, a paraffinic froth treatment plant 101 treats bitumen froth 201 with hot recycled solvent 204 to produce a high diluted bitumen 202 and rejects water, mineral and asphaltenes to froth separation tailings (not illustrated). The high diluted bitumen 202 stream is characterized by water content less than about 1500 wppm and asphaltenes on a dry bitumen basis up to about 14 wt %, optionally ranging from about 7 wt % to about 14 wt %, when treating bitumen froth by paraffinic solvent. For a specific solvent, asphaltenes in the bitumen product 205 are controlled by solvent to bitumen ratio (S/B ratio) and operating temperatures in the froth separation plant which vary the high diluted bitumen 202 feed into the diluent recovery plant 102 detailed on FIG. 2.

Figure 5:
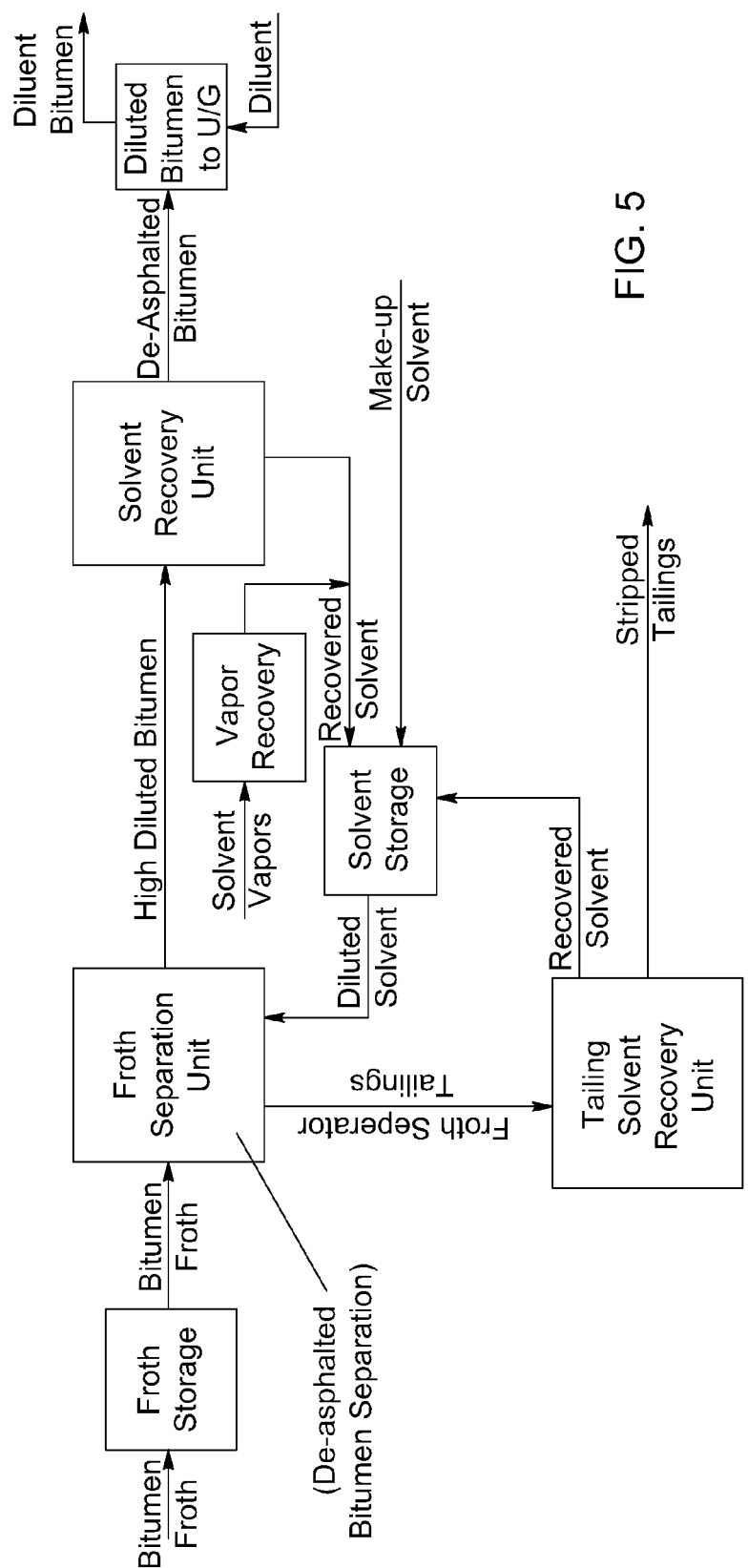
FIG. 5 is a block flow plan illustrating an example of an overall PFT operation comprising a froth separation unit, a tailings solvent recovery unit and a solvent recovery unit.
Figure 6:
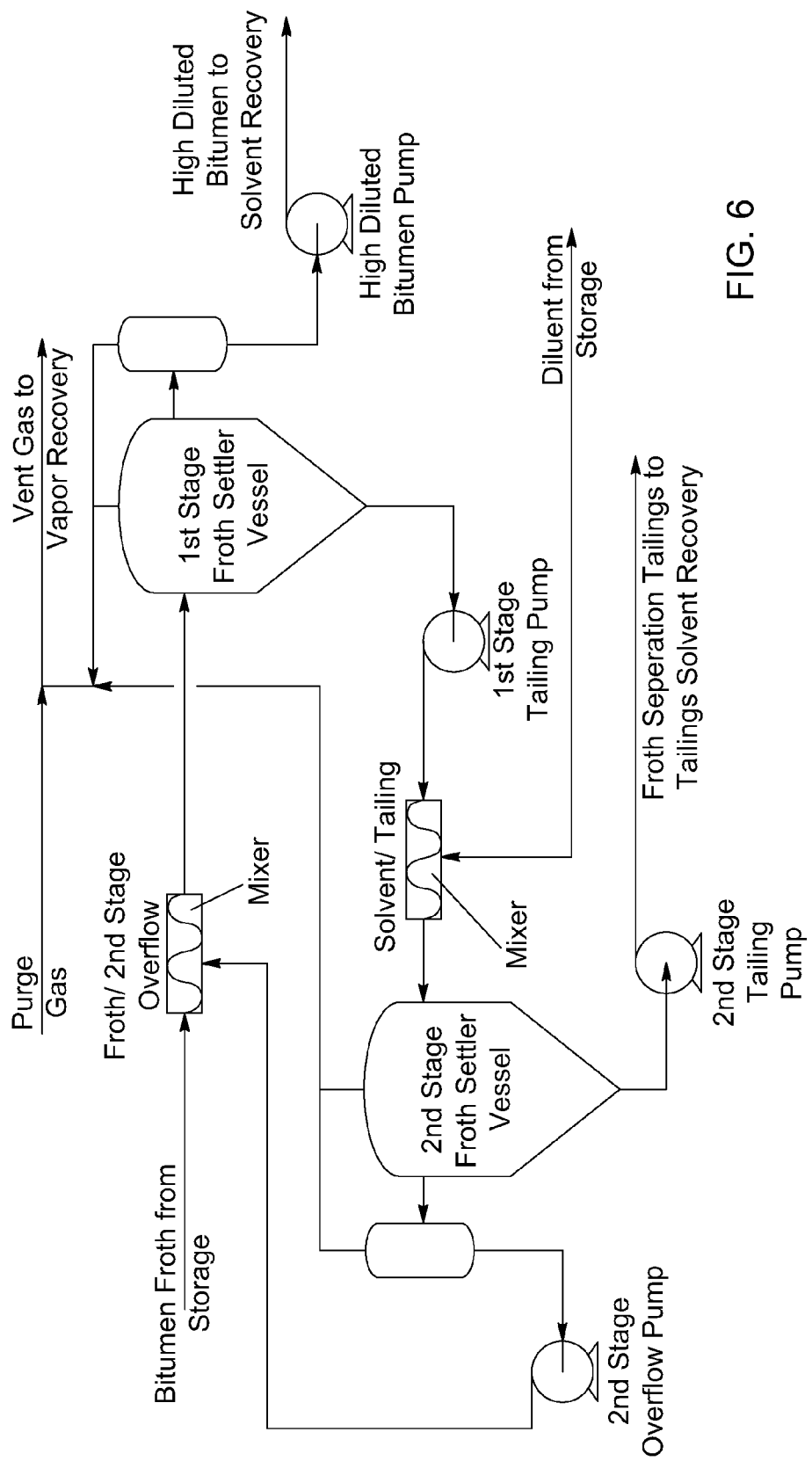
FIG. 6 is a block flow plan illustrating an example of a froth separation unit of a PFT operation.
Figure 7A:
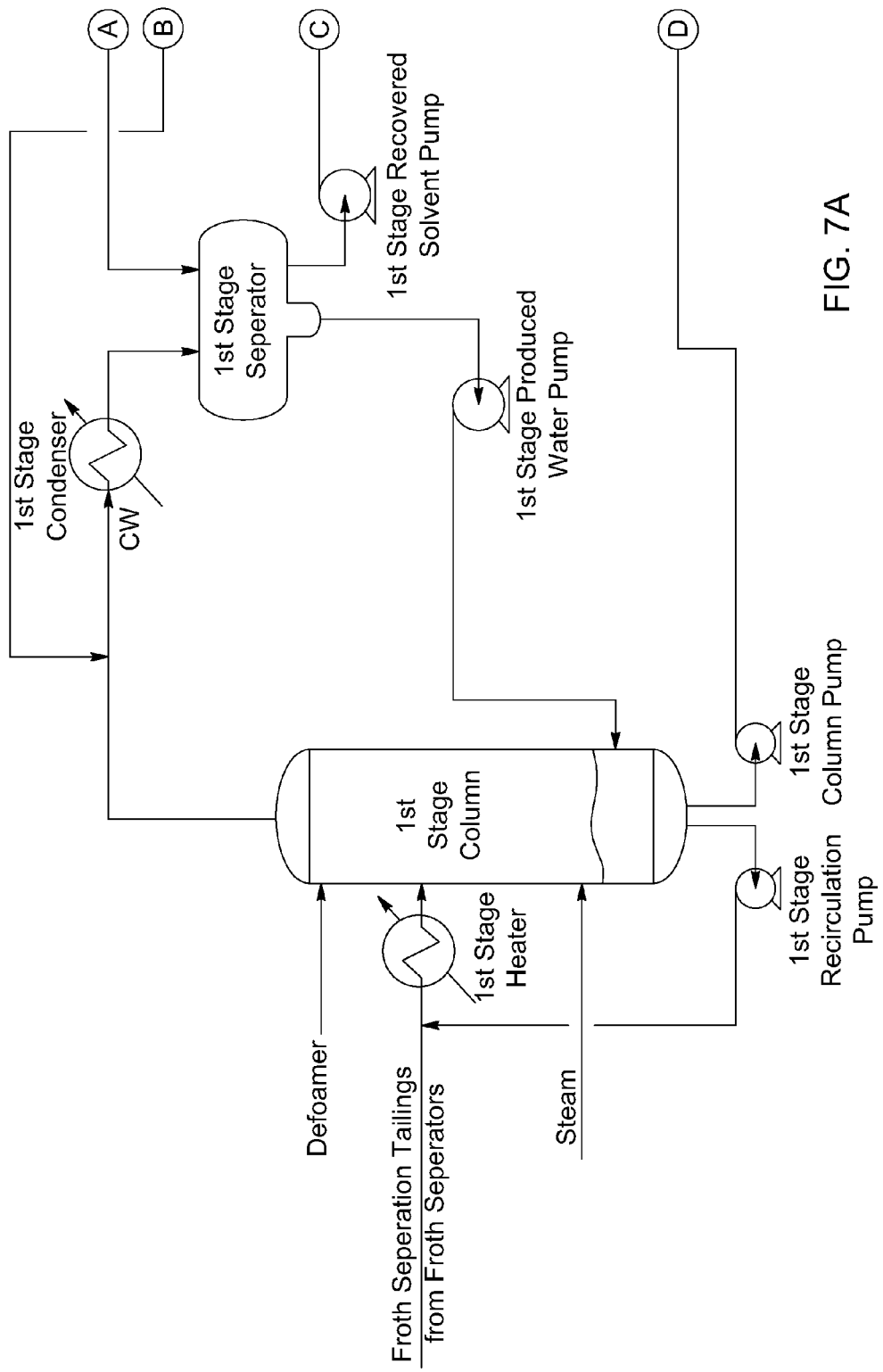
FIG. 7 is a block flow plan illustrating an example of a tailings solvent recovery unit of a PFT operation.
Figure 7B:
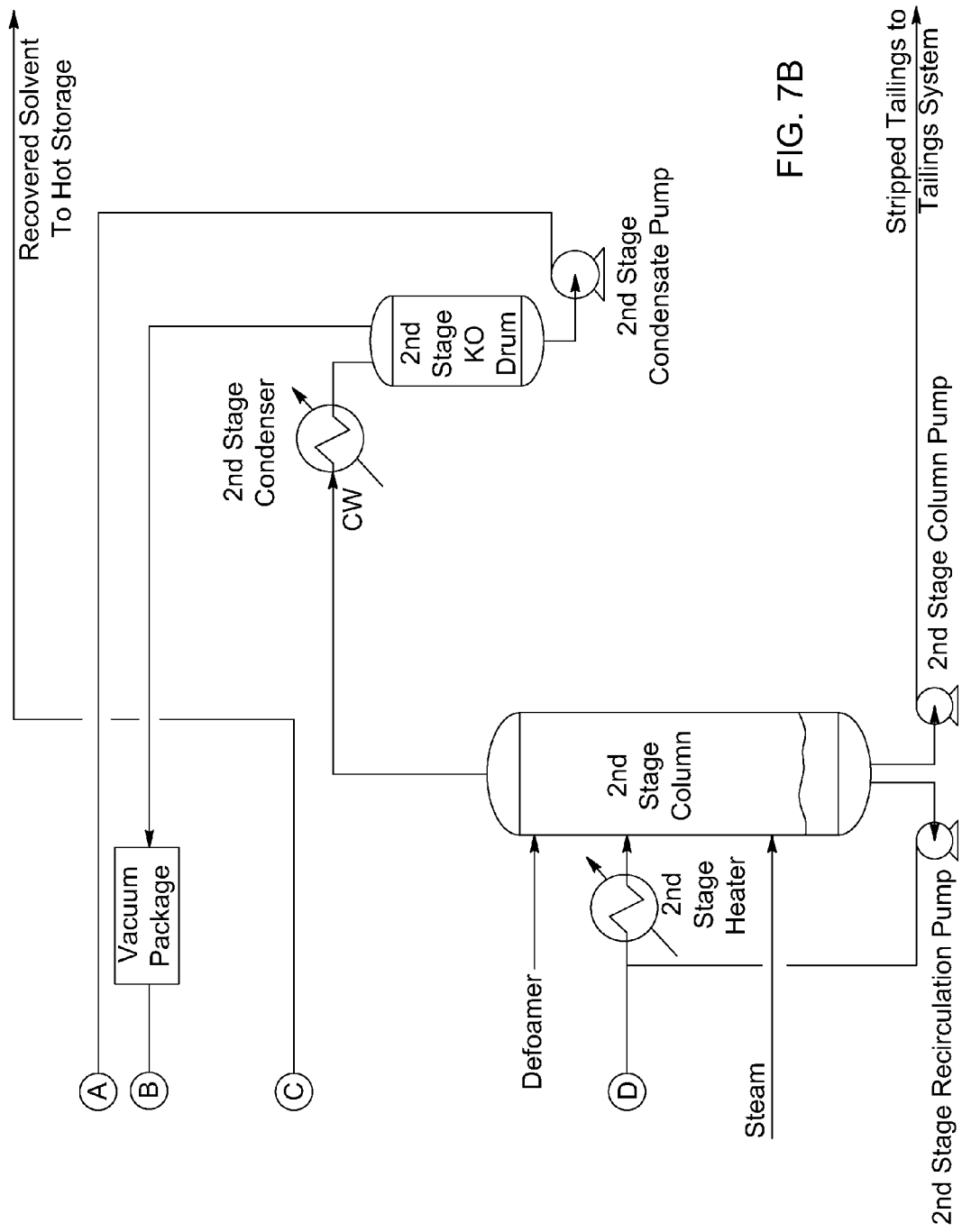

Referring briefly to FIG. 5, the overall paraffinic froth treatment (PFT) operation preferably comprises various units including a froth separation unit (FSU), a tailings solvent recovery unit (TSRU) and a solvent recovery unit (SRU), which are interconnected and may be additionally integrated to share various product and by-product streams. FIG. 6 shows a more detailed plan of an FSU and FIG. 7 shows a more detailed plan of a TSRU, which may be used in connection with various embodiments of the SRU and solvent recovery process of the present invention, which will be further described herein below.

Referring to FIG. 2, high diluted bitumen 202 is supplied from a bitumen froth separation apparatus (not shown) and is heated by exchangers 104,105,106 to recover heat from various product streams. In one optional aspect, the heat supplying streams comprise hot dry bitumen 206 which is supplied first to heat exchanger 106 and second to heat exchanger 104. In another optional aspect, the heat supplying streams comprise flashed solvent vapour 208 which is supplied to heat exchanger 105. In one aspect, the solvent vapour heat exchanger 105 is in between the two hot dry bitumen heat exchangers 104,106, and they are arranged serially as illustrated in FIG. 2. Not shown in figures is the feed pump in froth separation that pressures the high diluted bitumen stream 202.

In addition, supplemental heat may be provided by other streams that are recycled from downstream units. In one aspect, the recycled stream may be fed into the high diluted bitumen 202,207 prior to feeding into the solvent recovery flash vessel 107. For instance, dilute recycled bitumen 215, which is a portion of the bottoms from the flash vessel 107, may be recycled from the flash vessel 107 and heated through a recycle heat exchanger 109.

In one aspect, the hot high dilute bitumen 207 flashes sequentially in flash vessels 107 and 110. Valves or equivalent devices, schemes or means to produce backpressure, such as nozzle arrangements, limit two-phase flow upstream of the vessels as well as the pressure and vaporization in the vessels so as not to exceed the velocities for entrainment of feed to the overhead systems. In this regard, it is noted that for fluids that are susceptible to flashing when heated and contain abrasive particulate matter can cause significant damage in process lines and equipment. When such a fluid flashes in process equipment, the gas phase velocity can be so high so as cause the abrasive particulate matter to considerably and quickly damage the equipment, leading to equipment failure, vapour phase leakage of the fluid, permanent damage to equipment or significant shut-down times for process adjustments, repairs or replacement. In one preferred aspect, the incoming high diluted bitumen is kept in liquid phase along the heat exchangers 104,105,106 and corresponding lines. Providing backpressure using valves or other devices can ensure that the heat exchangers are protected from wear caused by flashing. A backpressure device such as a valve is provided to maintain a single phase through upstream heating systems and can be applied for various oil sands fluids containing abrasive particulate matter, such as clay, coke, minerals, and the like, which could cause wear such as erosion, abrasion and cavitation damage, upon flashing. Here it is noted that operations in which there are streams containing abrasive fine particulate matter, such as various froth treatment streams and fine coke particle containing streams, may also be transported and processed using placement of backpressure valves or devices to maintain liquid phase through upstream equipment. In one preferred aspect of the present invention, backpressure device such as valve 300 is used to provide backpressure upstream and allow flashing over the valve 300 in order to achieve greater predictably and control of the flashing-induced wear by limiting it to one point in the process. Although the flashing and wear may be more aggressive over the valve 300, it may act as a sacrificial component increasing predictability and monitoring to prevent a loss in containment, protection of more expensive equipment such as heat exchangers and overall safety of the process, are improved. Indeed, it is far easier to ensure fluid containment if the location for potential loss in containment is known and, preferably, well-understood and predictable to enable predetermined time for valve replacement. In another preferred aspect, at least two valves such as valve 300 are provided in parallel to facilitate maintenance or replacement while minimizing or eliminating process downtime. If there are no devices or schemes to keep the liquid in single phase through the exchangers, then the vapour forms in the exchangers and high velocities result. This means that wear and loss in containment can occur between the exchangers (including within the exchangers) leading up to the flash vessel. This is logistically very hard to monitor in an actual plant environment and loss in containments and incidents are difficult to control and avoid.

In another aspect, heating a higher bitumen content stream that has been stabilized by solvent removal provides the benefit that higher temperatures can be reached before fouling becomes an issue.

In this regard, in another aspect, diluted bitumen 215 from the flash vessel 107 is heated by a recycle heater 109 and mixed back into the high diluted bitumen 202,207 stream. It should be understood that the recycled dilute bitumen may be derived from either one or both of the flash vessels 107,110 and may be recycled into either one or both of the flash vessel feed streams 202,207,214 at various points in the line. The illustrated embodiment shows diluted bitumen recycle and heating is performed for the first flash vessel 107. In one aspect, the bitumen in diluted bitumen 215 lowers asphaltene precipitation in the hot high diluted bitumen 207 and the risk of fouling downstream equipment. In one aspect, as illustrated in FIG. 2, the mixing point of the dilute bitumen recycle stream 215 into the high diluted bitumen is upstream the pressure let down to flash vessel 107 and downstream of the heat exchangers 104,105,106 and valves, thus into the hot high dilute bitumen 207. This recycle point has a number of advantages. First, heat input from the bitumen recycle stream 215 aids the flash across the valve 300. Second, the back pressure of the valve restricts flashing the bitumen recycle diluted bitumen in the recycle exchanger 109. Third, this configuration also facilitates process start-up. In another optional aspect, the mixing point of the dilute bitumen recycle stream 215 into the high diluted bitumen may be downstream from the pressure let down valve 300 to flash vessel 107 and still downstream of the heat exchangers 104,105,106, and thus into the hot high dilute bitumen 207. It should be noted that the mixing point of the dilute bitumen recycle stream 215 may be at other locations, such as before or in between upstream heaters 104,105,106, and in such cases appropriate trade-offs may be considered for heat exchange efficiency. There may also be a number of parallel recycle lines for recycling the dilute bitumen recycle stream as several parallel streams into any combination of addition points as mentioned above and the parallel recycle streams may be controlled or adjusted so that at least one of them is recycling dilute bitumen back into the feed stream.

Referring still to FIG. 2, the flash columns 107,110 are sized and given specifications to reduce entrainment of bitumen droplets into overhead vapour systems. The partial condensation by flashed paraffinic solvent vapour 208 in the high diluted bitumen exchanger 105 facilitates returning flash condensate 211 that may contain high levels of bitumen to the bitumen column 113. The column reflux 221 minimizes bitumen in the solvent as column temperatures are preferably maintained below the initial boiling point for bitumen. This arrangement takes advantage of the gap in boiling points between the solvent and bitumen at the operating pressure for the bitumen column. S/B (solvent to bitumen) ratios are preferably controlled at the column tray level, which informs deciding which tray to enter at, to ensure contaminants do not pose a fouling risk.

In another aspect, a water draw tray in the bitumen column 113 allows the column water pump 115 to transfer condensed water 224 from the column to a condensed solvent drum 117 for separation of hydrocarbon from column water. The recovered water 225 is recycled for reuse. Temperature and pressure conditions for economic column operation traps water between the overhead vapour and the dry bitumen outlets leading to unstable operation without a water draw tray.

In another aspect, the heated column feed 218 flashes in the bitumen column 113. Steam or inert gas 222 is introduced below column feed 218 to strip residual solvent from dry bitumen product minimizing solvent losses in the dry bitumen product 205. The temperature and pressure operation of the column control the separation. If steam is used, its degree of super heat is controlled to ensure tray damage does not occur when encountering a hot diluted bitumen feed in the paraffinic process.

In another aspect, the high diluted bitumen feed heaters 104,105,106 recover heat from the hot dry bitumen 206 and flashed vapour streams. Approach temperatures dictate economic limits to heat recovery by exchangers.

In another aspect, the hot solvent 204 recovered from the PFT plant is returned directly to the froth separation vessels (not illustrated in FIG. 2). The condensing temperature for the condensed solvent drum 123 may be selected to match the temperature for solvent make up to froth separation without additional exchangers or limited number of exchangers for heating or cooling.

In another aspect, the hot diluent storage 103 provides inventory management to fill or empty the froth separation vessels, the diluent recovery vessels and associated piping.

Referring still to FIG. 2, the operation of embodiments and aspects of the present invention will be further described.

The high diluted bitumen 202 from froth separation is heated to above the vapour pressure of the solvent at flash conditions, for example about 125° C. for some embodiments of the process, as hot high diluted bitumen 207 to feed the flash vessel 107. The preferred upper temperature limit of the hot high diluted bitumen 207 is the vapour pressure of the lighter components of the heavy oil to avoid overflashing lighter components of the bitumen. It is thus understood that the preferred temperature range is tied to the operating pressures. Here it is also noted that the preferred temperature range is determined, controlled or implemented depending on the solubility of asphaltenes contained in the fluids which may cause fouling. Here it is also noted that operations in which oil sands streams are processed to recover solvent or other components through flashing and the streams also contain fouling media, may also be managed or implemented such that the operating temperatures and pressures allow solubility of the given fouling media in the underflow stream.

In one preferred aspect of the present invention, the heating of the high diluted bitumen may be done by recovering heat from hot bitumen product 206 by feed/bitumen product heat exchangers and from cooling flash vapour 208 by feed/flash vapour heat exchangers such as exchanger 105. The heat may be exchanged by heat exchanger devices, for example shell and tube heat exchangers, spiral type heat exchangers, plate and frame heat exchangers, or heat exchanger systems that are integrated or integral with the flash vessel, or a combination thereof. In one aspect, the heat exchange device comprises a plate and frame exchanger and the downstream backpressure device ensures that no vapour phase is present in the heat exchanger, resulting in improved heating efficiency. The heat exchanger devices may be configured to recover heat from diluent recovery plant 102 product streams. As premature flashing of hot high diluted bitumen 207 can produce unstable flows in heat exchangers and fluctuating pressure on the feed pumps and add control complexity for turn-down, this may be regulated by a valve or flow restriction prior to the first flash vessel 107. In addition, each of the heat exchange devices, for example heat exchange devices 104,105,106, may be a series of multiple heat exchangers.

Figure 3:
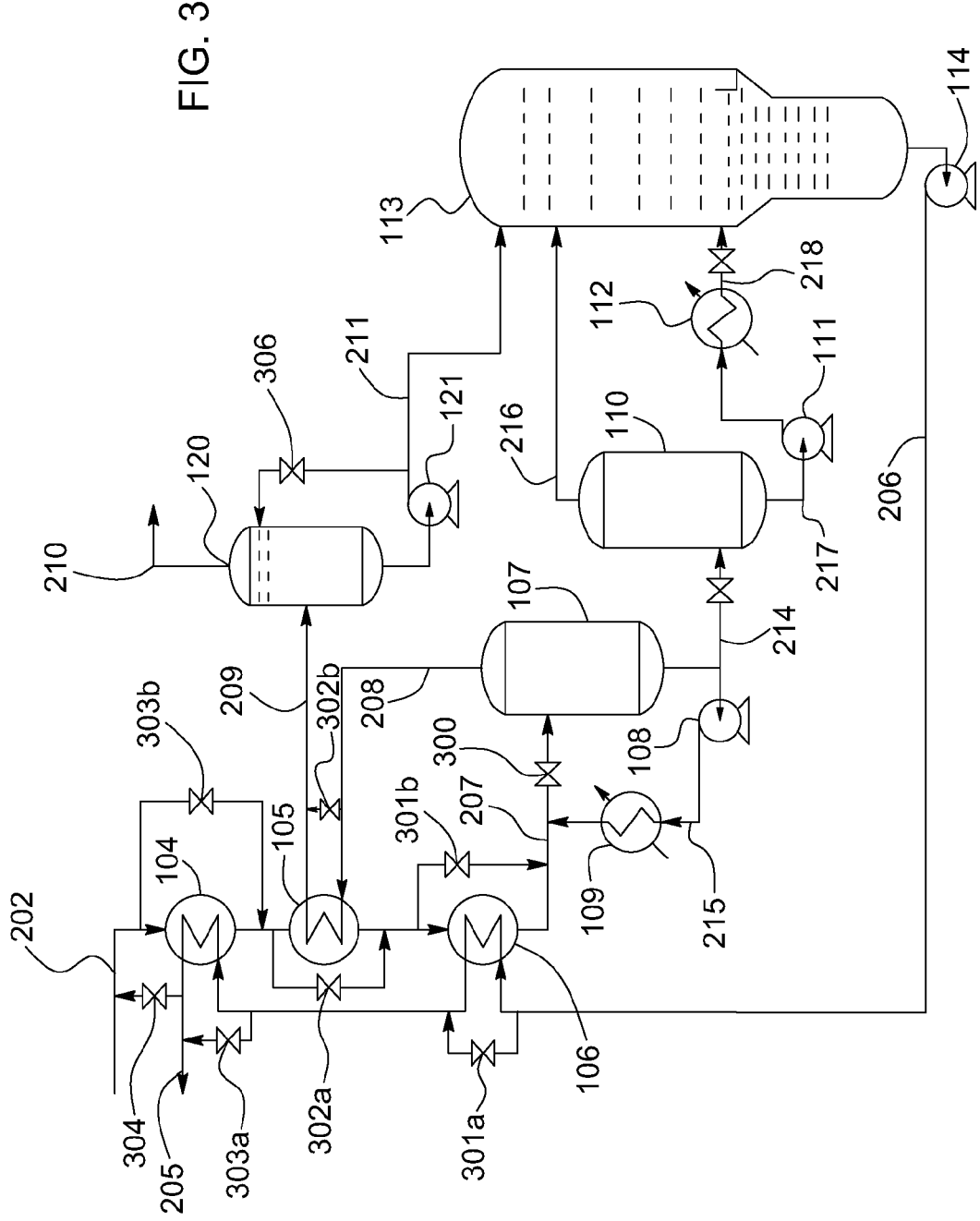
FIG. 3 is a block flow plan illustrating part of a diluent recovery operation according to another embodiment of the present invention.

Referring now to FIG. 3, there may also be bypass lines and corresponding valves in order to regulate the temperature of the hot diluted bitumen 207 and accommodate S/B ratio variations, by bypassing the heat exchangers. The preferred valve arrangements are illustrated as valves 301a, 302a and 303a, which bypass certain streams. More particularly, preferably valves 301a and 303a are provided to allow bypassing a part of the hot bitumen stream 206, instead of bypassing the high diluted bitumen feed. Nevertheless, the bypass may alternatively be achieved using valves 301b and 303b to bypass the high diluted bitumen feed. In terms of bypassing heat exchanger 105, the preferred configuration uses valve 302a to bypass a part of the high diluted bitumen feed, rather than bypassing the flash solvent vapour 208. The preferred valve arrangements 301a, 302a and 303a, allow bypassing the liquid fluid, whereas the bypass valves on the other side of the exchanger 301b, 302b and 303b are more likely to involve multiphase flow which is preferably avoided. It should nevertheless be noted that various combinations of valves 301a, 301b, 302a, 302b, 303a and 303b may be used to regulate bypassing and the temperature of the various streams as desired.

High diluted bitumen 202 feed to the diluent recovery plant is preferably at equilibrium solubility between asphaltenes and the paraffinic solvent, reflecting the specific solvent to bitumen ratio and temperature in the froth separation. As high diluted bitumen is heated, the solubility equilibrium shifts causing asphaltenes to precipitate and foul equipment. By injecting the diluted bitumen recycle 215 from flash vessel 107 into high diluted bitumen, for instance pumped by flash vessel recycle pump 108 through flash vessel feed heater 109 and into the hot high diluted bitumen 207, stabilization of the hot high diluted bitumen 207 feed to the flash vessel 107 can be achieved. While steam or other heating media can provide heat for the flash vessel feed heater 109, as indicated in FIG. 2, other configurations such as recovering heat from hot bitumen 206 into the diluted bitumen recycle 215 may be used, with attention to efficiency trade-offs, to minimize diluent recovery plant 102 heat exchanger costs and utility requirements. In addition, dilute bitumen from the second flash vessel 110 or any other dilute bitumen stream may be recycled to stabilize diluted bitumen 202,207,214 prior to feeding into its corresponding flash vessel 107,110.

It should be noted that FIG. 2 illustrates a two-stage flash system in which hot high diluted bitumen 207 in the first flash vessel 107 produces flash solvent vapour 208 and diluted bitumen 214, the latter of which is fed into the second flash vessel 110 that produces second flash vapour 216 and second diluted bitumen 217 stream. In one aspect, the pressures at which the flash vessels are preferably controlled permit (i) recovery of heat back into high diluted bitumen 202 feed by heat exchangers and (ii) maintaining consistent bitumen column feed 218 to the bitumen column 113 by directing the second flash vapour 216 into bitumen column 113 as a separate vapour stream.

Conventional flash vessels employ gravity separation for disengagement of small droplets entrained in the vapour followed by mist eliminators as mesh pads in the top of the vessel and are specified design guidelines. However, in paraffinic froth treatment, asphaltenes in bitumen droplets precipitate at solvent concentrations in flash vessel vapour streams and to avoid premature outages due to fouling mist eliminators are preferably avoided. Without mist eliminators, the primary means to limit entrainment of bitumen droplets depends on vessel cross-sectional area to ensure vapour velocities permit droplets to settle by gravity. For a single stage flash vessel, the cross section area preferably reflects the full range of high diluted bitumen feed 202 variations to the diluent recovery plant 102, with the flash pressure limiting subsequent processing. With two or more flash stages, high diluted bitumen feed 202 variations can be distributed over the stages to optimize the cross-sectional area of each stage to minimize entrainment while minimizing adverse affects on downstream operations.

It should be noted, however, that practicality can limit droplet sizes that can be achieved in a flash vessel by gravity separation alone. While precipitation of asphaltenes in paraffinic solvents from bitumen mists entrained in flash vapour can foul equipment, maltenes fraction of bitumen modifies asphaltenes solubility in the froth separation plant and adversely affects production of high diluted bitumen.

In some aspects, there is an additional potential problem related to "contaminants" that may be entrained in the flashed solvent vapour. Lighter end components of the bitumen, such as aromatics and other hydrocarbon components, may flash or be entrained with the solvent vapour as "contaminants". In some cases, such aromatic or higher molecular weight hydrocarbon act as contaminants in which asphaltenes are soluble or affect asphaltene solubility and can be carried with the fraction of solvent recovered and will build-up in an optimised closed solvent loop. In some cases, the contaminants are carried with the solvent vapour and accumulate in the overall system. For instance, since the solvent is recovered and reused in the froth separation unit, the contaminants may build up in the recovered and reused solvent which reduces the effectiveness of the solvent added to the bitumen froth and, accordingly, necessitates higher S/B ratios required for the froth separation unit (FSU). If the S/B ratio is not increased, the contaminants may act as a "poison" to the paraffinic process and prevent the required asphaltene separation in the FSU at the designed S/B ratio. However, compensating for contaminants by increasing the S/B ratio in the FSU may lead to a detrimental loop that prevents operating the system as intended or at optimum efficiencies. For example, upfront equipment design and sizing may have inherent limits on the maximum S/B ratio that may be used. These contaminants and their corresponding drawbacks may be dealt with in a number of ways. In one aspect, the contaminants may be fractionated in the flash drum with trays or packing and an amount of reflux. In another aspect, the contaminants may be fractionated in the flash vessel by adding a tray and an amount of reflux. In another aspect, at least a part of the flashed solvent vapour of one or both of the flash vessels is integrated into the bitumen column where the contaminants may be fractionated and removed from the recovered solvent. In another aspect, aromatic and hydrocarbon contaminants may tend to have a heavier molecular weight than the solvent and, as such, can be influenced to precipitate out preferentially with the condensate. In another aspect, the contaminants may be measured, determined, modelled or estimated in a given stream, such as the recovered solvent or another stream, to determine the means of contaminant removal. In some cases, solubility data or measurements may be collected for a given contaminant, e.g. aromatics or hydrocarbons such as cycloparaffins, in order to predict the increase in asphaltene solubility brought about by the presence of the given contaminant. The data may be collected based on existing solubility studies or be gathered in the lab for a given set of variables. For example, previously obtained data on asphaltene solubilities in various solvents and compounds exist, such as Mitchell & Speight's article "*The solubility of asphaltenes in hydrocarbon solvents*" Fuel, 1973, Vol. 52, and may be used to inform system design and control. It should be noted that various calculations may be made to determine the method by which the contaminants may be most efficiently removed for given operating conditions and design constraints. For instance, while the bitumen column may be used to clean and reduce contaminants in the recovered solvent, it may be desirable and more efficient to reduce the load on the bitumen column by adding one or more trays to other separation drums or providing increased reflux in the flash vessel to knock out additional light end bitumen contaminants. It is also noted that Mitchell & Speight's article presents data for relatively low temperatures. At higher temperatures, the solubility parameters for the listed compounds will likely change; however, high temperature systems will continue to benefit from contaminant management and removal. The specific effects of various contaminants at higher temperatures may be measured or identified by various techniques in order to tailor the removal and processing for high temperature conditions, such as between 70° C. and 90° C. It should also be noted that the solubility parameter ($\delta = \gamma V^{-1/3}$ where $\gamma$ is the surface tension and V is the molar volume) which is discussed in the article, may be identified for individual contaminants and also for mixtures, as described in Mitchell & Speight, wherein for mixtures two different compounds were additive on a mole-fraction basis.

In another aspect, to reduce contamination of recovered flash solvent 124—such contamination coming from bitumen mist entrained from the flash vessel 107—the flashed solvent 208 is cooled by the feed and flash heat exchanger 105 to produce flash vapour solvent condensate 209 that is then separated in the flash solvent drum 120 into flash solvent drum condensate 211 and flash solvent drum vapour 210. The flash solvent drum 120 provides a secondary flash vessel in which bitumen mist droplets can coalesce with liquid droplets that produce the flash drum condensate 211 which is transferred by flash solvent drum 121 for fractionation in the bitumen column 113. A portion of the flash condensate 211 may be recycled as a wash on trays in flash solvent drum 120 as illustrated in FIG. 3, or alternately sprayed into the flash vapour condensate 209 and/or the feed/flash heat exchanger 105. A solvent drum recycle valve 306 can regulate the recycling. This option may be used to compensate for aromatic and other hydrocarbon contaminants depending on components that build-up over the run-time of the plant, to maintain circulation sufficiently constant so as to minimize or reduce the deposit of asphaltenes in the system. The blending of different solvent compounds can change asphaltene solubility and, as such, the contamination components and concentrations affect the solubility levels. For example, depending on the specific contaminants contained in the system and the asphaltenes' solubility parameter therein, the above-described methods may be utilized, controlled or tailored to control asphaltene solubility for given stream compositions. Some contaminants may be present in amounts of 5000 to 10,000 ppm, depending on type of contaminant. Contaminants may be present in amounts of 5000 wppm toluene equivalent or 800 wppm toluene equivalent, wherein "toluene equivalent" is based on the case of toluene as sole contaminant. Particularly prevalent are aromatic compounds with higher molecular weight than the paraffinic solvent which may be captured by using embodiments of the invention described herein. Known data and techniques for determining asphaltene solubilities in various solvents, such as Mitchell & Speight's article "*The solubility of asphaltenes in hydrocarbon solvents*" Fuel, 1973, Vol. 52, may be used to inform system design and control.

Figure 4:
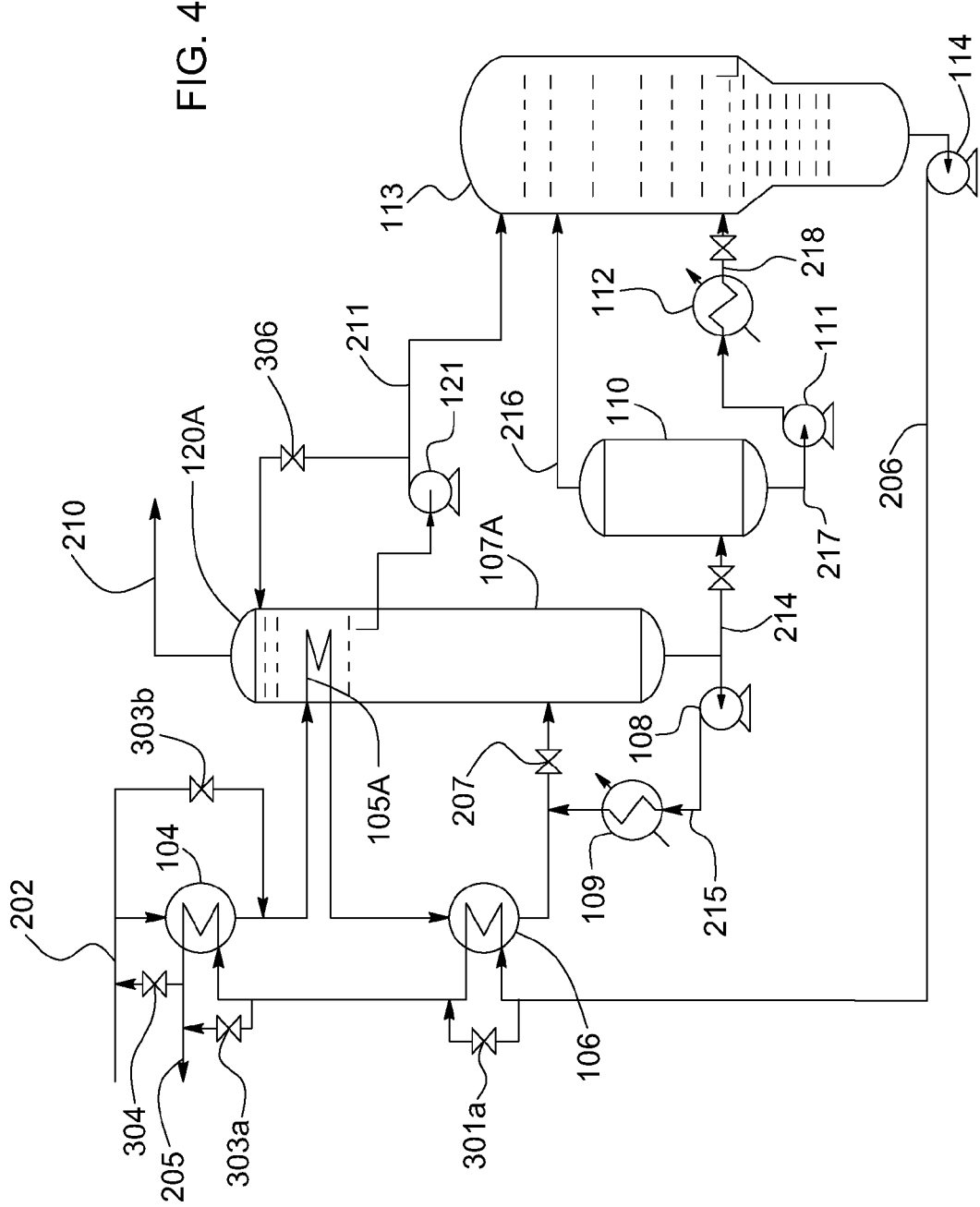
FIG. 4 is a block flow plan illustrating a dilute recovery operation according to a further alternate embodiment of the present invention.

Referring to FIG. 4, in another aspect, the first flash apparatus may include a flash vessel section 107a and an integrated flash solvent drum 120a there-above, with a feed/flash heat exchanger 105A cooling the flashed vapours internal to the combined flash apparatus resulting in a reduced footprint, reduced capital costs, and potential safety increase in the case of 105A tube leakage. In this aspect, the first stage flash, mid exchanger and flash solvent drum are combined into a single vessel.

In another aspect, preferably the flash solvent drum vapour 210 is condensed by flash solvent condenser 122 and the cooled flash vapour 212 is collected in the condensed solvent drum 123 for transfer as recovered flash solvent 213 by the condensed solvent pump 124 to the hot recycled solvent 202 system. The cooling media for the flash solvent condenser can be cooling water or air. For either cooling option, condensing at high pressure maximizes the temperature of the flash solvent condensate 211 to heat hot recycled solvent 202.

In another aspect, the second flash vessel 110 is preferably operated at a pressure to maintain a consistent bitumen column feed 218, by flashing solvent vapour as second flash vapour 216 directly to the bitumen column 113 where fractionation minimizes entrained bitumen mist from contaminating recovered column solvent 118. The second flash diluted bitumen 217 from second flash vessel 110 may be heated by bitumen column heater 112 under pressure to prevent two phase flow in bitumen column feed 218 before introduction to the bitumen column 113. The heating media used in bitumen column heater 112 is steam or hot oil media in shell and tube or spiral heat exchangers, alternatively fuels such as natural gas in a fired heater.

In one aspect, the bitumen column 113 fractionate bitumen column feed 218 to a hot dry bitumen 206 product with less than about 0.5 wt % solvent and a recovered column solvent 223 with less than about 5000 ppm bitumen, preferably less than about 800 ppm. The bitumen contained in the recovered solvent is of course the lighter end components and contaminants including light aromatics and other hydrocarbons. These values may of course change depending on the given contaminant and solvent being used. The column may also reduce the solvent loss below 1000 ppm to recover more of the solvent which is a valuable commodity, or the column may be operated for solvent loss to be able to meet particular pipeline specifications which may be a higher solvent content, possibly over 0.5 wt %. The pressure at which fractionation in the bitumen column 113 occurs is preferably selected for effective heat recovery from hot bitumen stream 206 for reintroduction into the high diluted bitumen 202, for effective utility of cooling media used by column condenser 116 for heating other processes, and for minimization of heating the hot recycled solvent 204 to the froth separation plant 101.

In one aspect, the bitumen column 113 may have two distinct sections relative to the point at which bitumen column feed 218 enters the column: the lower section focuses on stripping solvent from the dry bitumen product 206 while the upper section focuses on fractionation of bitumen from the recovered column solvent 223. Column stripping steam/gas 222 may be injected below the bottom tray to strip residual solvent from bitumen. Steam stripping is a common industry practice with details provided in many texts such as "*Refining Processes Handbook*", S Parkash, 4$^{th}$ edition published by Elsevier 2003, which provides guidance on a number of trays for stripping and the steam rates, which can be used and adapted for the purposes of the present invention.

In one aspect, a portion of the recovered column solvent 223 is preferably returned to the top tray of the bitumen as column reflux 221. As the liquid passes through fractionation trays, entrained bitumen in flash solvent drum condensate 211, second flash vapour 215 and vapours from the stripping section of the bitumen column, residual bitumen is separated and transferred as the hot dry bitumen 206.

The configuration of the upper fractionation trays preferably minimizes dead zones that promote asphaltene fouling and can adversely affect the separation.

In another aspect, the column overhead vapour 219 is preferably cooled by column condenser 116 using water, where other process operations such as hot water extraction process can reuse the heat, or alternately air. Methodologies such as set out in "*Pinch analysis and process integration, a user guide on process integration for the efficient use of energy*" I. Kemp 2$^{nd}$ edition published by Elsevier 2007, may be applied to diluent recovery plants to improve and optimize energy use.

In another aspect, the cooled overhead vapour 220 from the column condenser 116 preferably separates in a column separator 117 following design guidelines such a set out in "*Successfully Specify Three-Phase Separators*" W. Svrcek, et al Chemical Engineering Progress September 1994, into three streams: non-condensable vapours/gases, recovered column solvent 223 and column water 225. Non-condensable vapours and gases are vented as vent gas 227 with inert gas 226 maintaining pressure on the column separator 117 and the condensed solvent drum 123. Recovered column solvent 223 is transferred by the column solvent pump 118 back to the bitumen column 113 as column reflux 221 or blended with recovered flash solvent 213 as hot recycled diluent 202.

In another aspect, residual water in high diluted bitumen 202 and steam introduces water into bitumen column 113. However, the temperature profile in the column between the column overhead vapour 219 and hot dry bitumen 206 is controlled or operated so as to permit water to condense within the column. To help prevent unstable operation, column water 224 may be withdrawn by a water draw tray in bitumen column 113 by water draw off pump 115 and transferred to a column separator 117 to permit separating of entrained solvent from the stream. The recovered water pump 119 transfers water separated in column separator 117 as column water 224 for reuse as process utility water for example.

In another aspect, as shown in FIG. 1, the hot recycled paraffinic solvent 204 is returned directly to the froth treatment plant 101. Hot diluent storage 103 allows surge capacity for inventorying the froth treatment plant and solvent recovery plant on start-ups or de-inventory during outages. In addition, as shown in FIG. 3, valve 304 permits the recycle of dry bitumen 205 into high diluted bitumen 202 to facilitate warming up the plant during start-up or maintaining plant circulation in stand-by operational mode in event of limitations in feed supply.

In one aspect, the operating temperatures and pressures are implemented or controlled to maximize integrated operation and heat recovery, including water integration and heat recovery if used to condense overhead vapour streams.

In a further aspect, the condensed solvent drum 123 and associated condensed solvent pump 124 are helpful for independent operation of the flash section of the diluent recovery plant. These elements could with increased operational complexity be integrated into the column separator operation.

Various embodiments of the present invention provide advantages, in particular with regard to the production of a dry bitumen stream, such as the following:

- Improving level of heat recovery from product streams into the feed to minimize requirements for external heat input and cooling.
- Reducing size of flash vessels while maintaining acceptable levels of entrainment into overhead systems.
- Recovering a high quality solvent to minimize asphaltene fouling in downstream piping and equipment or adversely affecting precipitation of asphaltenes in froth treatment.
- Recycling a hot solvent stream to minimize heat addition in the froth separation process.
- Recycling diluted bitumen streams to limit asphaltene fouling.
- Withdrawing water in the bitumen column for increased operation stability.
- Minimizing solvent losses to the dry bitumen product to minimize operating expense while permitting flexibility for specialty bitumen markets.
- Improving heating and solvent recovery control for narrow boiling point liquids.
- Improving turndown and control for heating and for solvent recovery.

Some embodiments of the process and system according to the present invention may be summarized as including at least one of the following enhancements:

- The high diluted bitumen is heated under pressure prior to two or more flash stages with each flash vessel sized to minimize overhead entrainment of liquids with or without demisting devices to increase efficiency and minimize the overall cost of the plant, preferably both capital and operating costs. Smaller vessels also increase opportunities for offsite modular fabrication.
- Flashed diluted bitumen is heated and recycled into high diluted bitumen streams to shift the asphaltene precipitation equilibrium away from asphaltene precipitating and fouling equipment. The recycle also minimizes a retention time which also assists reducing asphaltene depositions.
- Flashed vapour is partially condensed and the flashed solvent condensate is cleaned by fractionation in the bitumen column. The bitumen column overhead vapours are cleaned by the column reflux to minimize entrained bitumen in the recovered column solvent.
- The solvent may be partially removed in a flash drum prior to entering a column to reduce column size and vapour traffic. The flash drums may contain trays or packing with reflux to improve the quality of the solvent recovered.
- A water draw is incorporated in the bitumen column to permit removing water that may condense in column leading to unstable operation. Water that may contain solvent from the column may be separated in the overhead condensed solvent drum to minimize capital expense.

The diluent recovery plant is closely coupled and integrated to the froth treatment plant. This permits maximizing heat recovery from the diluent product streams into the high diluent feed stream. Hot solvent storage allows for routine plant inventory changes from start-up to full operation without additional heat exchangers for heating/cooling streams.

The production of dry bitumen product by stripping residual solvent minimizes the solvent make up requirements for process losses and associated operating costs. The dry bitumen also advantageously allows potential for segregation of upstream operations from downstream marketing. Varying froth treatment operating conditions using a specific solvent can target bitumen product for specific markets, such as high or low asphaltene refineries or upgraders.

Furthermore, the solvent recovery plant may consist of a single dedicated plant or multiple plants in parallel processing high diluted bitumen from one or more froth treatment plants. The embodiments described and illustrated herein reflect a single train of equipment; however, at large scales multiple parallel trains of exchangers are optional and may be preferred. For instance, there may be advantages to arranging parallel trains including flash vessels to facilitate operational flexibility and partial unit outages. Exchangers and pumps in the diluent recovery plant may also consist of multiple units in parallel to provide operational flexibility and reliability. To facilitate plant start-up or shut-down or holding standby modes, pumps can re-circulate fluids back to feed systems such as returning dry bitumen back to the high diluted bitumen feed in FIG. 1.

In addition, the inclusion of recycling product and by-product streams either within the unit or to upstream and downstream operations may facilitate unit start-up and standby operating modes frequently encountered in oil sand operations due range of oil sands being mined and processed (e.g. oil sands ore containing about 6 wt % to about 13 wt % bitumen) and equipment reliability in such an abrasive operating environment.

Heat recovery from paraffinic diluent product streams back into the feed stream to a diluent recovery plant may be particularly advantageous. In addition, the relative volume of high diluted bitumen and temperature requirements of paraffinic froth treatment lead to advantages in integrating froth treatment and diluent recovery operations to increase efficiencies and reduce costs.

It is noted that while the overall solvent recovery process described and illustrated herein is not suitable for naphthenic solvent recovery applications, there are a number of techniques and methodologies described herein that would be applicable and beneficial to a naphthenic solvent recovery process or other types of solvent recovery processes that could be employed in the oil sands industry. It is also noted that the paraffinic solvent recovery unit 102 as described herein and illustrated in detail in FIG. 2, is preferably part of an overall PFT operation as illustrated in FIG. 5 and is integrated with a FSU such as in FIG. 6 and a TSRU such as in FIG. 7. Fluid and heat integration between the FSU, SRU and TSRU as well as within each one of these units, may include mixing of similar streams together, recycling streams to increase or decrease certain concentrations or ratios (e.g. S/B ratio) of certain streams, directly or indirectly heat or cool certain streams to improve performance and efficiency of the overall PFT operation.

The invention claimed is:

1. A paraffinic solvent recovery process for treating a high paraffin diluted bitumen containing bitumen and residual water, fine solids and asphaltenes, the high paraffin diluted bitumen being derived from a paraffinic froth separation operation that separates a bitumen froth into a solvent diluted tailings component and the high paraffin diluted bitumen, comprising:
  pre-heating the high paraffin diluted bitumen to produce a heated high paraffin diluted bitumen;
  supplying the heated high paraffin diluted bitumen to a paraffinic solvent flashing apparatus;
  separating the heated high paraffin diluted bitumen within the paraffinic solvent flashing apparatus into a flashed paraffinic solvent component and a diluted bitumen underflow component;
  deriving a hot dry bitumen from the diluted bitumen underflow component;
  wherein the pre-heating comprises indirectly transferring heat to the high paraffin diluted bitumen from the hot dry bitumen.

2. The paraffinic solvent recovery process of claim 1, wherein the pre-heating of the high paraffin diluted bitumen further includes recovering heat from the flashed paraffinic solvent component.

3. The paraffinic solvent recovery process of claim 2, wherein the pre-heating is at least partially performed in at least one flashed paraffinic solvent heat exchanger.

4. The paraffinic solvent recovery process of claim 3, further comprising bypassing a part of the high paraffin diluted bitumen around the flashed paraffinic solvent heat exchanger.

5. The paraffinic solvent recovery process of claim 1, wherein the pre-heating of the high paraffin diluted bitumen is performed by recovering heat from the hot dry bitumen.

6. The paraffinic solvent recovery process of claim 1, wherein the pre-heating is at least partially performed in at least one hot dry bitumen heat exchanger.

7. The paraffinic solvent recovery process of claim 6, further comprising bypassing a part of the high paraffin diluted bitumen around the hot dry bitumen heat exchanger.

8. The paraffinic solvent recovery process of claim 1, wherein the pre-heating comprises serially pre-heating the high paraffin diluted bitumen and the process further comprises:
  transferring heat from the flashed paraffinic solvent component to the high paraffin diluted bitumen; and then
  transferring heat from the hot dry bitumen component to the high paraffin diluted bitumen, producing a partially cooled dry bitumen.

9. The paraffinic solvent recovery process of claim 2, wherein the pre-heating of the high paraffin diluted bitumen with the flashed paraffinic solvent component comprises passing the high paraffin diluted bitumen in a heat exchange line through an upper part of the paraffinic solvent flashing apparatus.

10. The paraffinic solvent recovery process of claim 1, wherein the pre-heating further comprises transferring heat to the high paraffin diluted bitumen from the diluted bitumen underflow component.

11. The paraffinic solvent recovery process of claim 10, wherein transferring heat to the high paraffin diluted bitumen from the diluted bitumen underflow component comprises returning a portion of the diluted bitumen underflow component as a returned diluted bitumen component into the high paraffin diluted bitumen prior to introduction into the paraffinic solvent flashing apparatus.

12. The paraffinic solvent recovery process of claim 11, further comprising heating the returned diluted bitumen component prior to mixing into the high paraffin diluted bitumen.

13. The paraffinic solvent recovery process of claim 1, wherein the paraffinic solvent flashing apparatus comprises:
   a first flash vessel for receiving the high paraffin diluted bitumen and producing a first flashed paraffinic solvent component and a first diluted bitumen underflow component; and
   a second flash vessel for receiving the first diluted bitumen underflow component and producing a second flashed paraffinic solvent component and a second diluted bitumen underflow component.

14. The paraffinic solvent recovery process of claim 1, comprising imparting sufficient backpressure on the high paraffin diluted bitumen prior to introduction into the paraffinic solvent flashing apparatus to maintain the high paraffin diluted bitumen in liquid phase.

15. The paraffinic solvent recovery process of claim 14, wherein the backpressure is imparted by a valve or flow restriction.

16. The paraffinic solvent recovery process of claim 15, wherein the backpressure is imparted by a valve arranged downstream of all of the pre-heating of the high paraffin diluted bitumen.

17. The paraffinic solvent recovery process of claim 1, wherein the paraffinic solvent comprises C4 to C6 paraffins.

18. The paraffinic solvent recovery process of claim 1, wherein the paraffinic solvent has a boiling point range between varying by at most about 25° C.

19. The paraffinic solvent recovery process of claim 1, wherein the paraffinic solvent comprises pentane.

20. The paraffinic solvent recovery process of claim 1, wherein the paraffinic solvent consists essentially of pentane.

21. The paraffinic solvent recovery process of claim 4, further comprising bypassing a part of the flashed paraffinic solvent around the at least one flashed paraffinic solvent heat exchanger.

22. The paraffinic solvent recovery process of claim 6, further comprising bypassing a part of the hot dry bitumen around the at least one hot dry bitumen heat exchanger.

23. The paraffinic solvent recovery process of claim 8, wherein the pre-heating comprises using a heat exchanger series to serially heat the high paraffin diluted bitumen, the heat exchanger series comprising:
   a downstream heat exchanger for transferring heat from the hot dry bitumen component to the high paraffin diluted bitumen, producing the partially cooled dry bitumen;
   a middle heat exchanger for transferring heat from the flashed paraffinic solvent component to the high paraffin diluted bitumen; and
   an upstream heat exchanger for transferring heat from the partially cooled dry bitumen to the high paraffin diluted bitumen.

24. The paraffinic solvent recovery process of claim 11, wherein the returned diluted bitumen component is returned at a temperature and in an amount sufficient to shift asphaltene precipitation equilibrium so as to reduce asphaltene precipitation in the paraffinic solvent flashing apparatus.

25. The paraffinic solvent recovery process of claim 13, wherein the pre-heating comprises returning the first diluted bitumen underflow component into the high paraffin diluted bitumen.

26. A paraffinic solvent recovery process for treating a high paraffin diluted bitumen derived from a paraffinic froth separation operation that separates a bitumen froth into a solvent diluted tailings component and the high paraffin diluted bitumen, comprising:
   indirectly pre-heating the high paraffin diluted bitumen by indirect heat transfer from at least one downstream process fluid derived from the high paraffin diluted bitumen, to produce a pre-heated high paraffin diluted bitumen;
   directly pre-heating the pre-heated high paraffin diluted bitumen by introducing a fluid therein to produce a heated high paraffin diluted bitumen;
   supplying the heated high paraffin diluted bitumen to a paraffinic solvent flashing apparatus; and
   separating the heated high paraffin diluted bitumen within the paraffinic solvent flashing apparatus into a flashed paraffinic solvent component and a diluted bitumen underflow component.

27. The paraffinic solvent recovery process of claim 26, further comprising deriving a hot dry bitumen from the diluted bitumen underflow component.

28. The paraffinic solvent recovery process of claim 27, wherein the step of indirectly pre-heating comprises indirectly transferring heat to the high paraffin diluted bitumen from the hot dry bitumen.

29. The paraffinic solvent recovery process of claim 26, wherein the step of indirectly pre-heating comprises indirectly transferring heat to the high paraffin diluted bitumen from the flashed paraffinic solvent.

30. The paraffinic solvent recovery process of claim 26, wherein the step of indirectly pre-heating comprises using a heat exchanger series to serially heat the high paraffin diluted bitumen.

31. The paraffinic solvent recovery process of claim 26, wherein the step of directly pre-heating the pre-heated high paraffin diluted bitumen comprises introducing a portion of the diluted bitumen underflow component therein.

32. A process comprising:
   contacting bitumen froth with a paraffinic solvent to produce solvent diluted bitumen froth;
   separating the solvent diluted bitumen froth into a solvent diluted tailings component and high paraffin diluted bitumen;
   recovering paraffinic solvent from the high paraffin diluted bitumen, wherein the recovering comprises:
   pre-heating the high paraffin diluted bitumen to produce a heated high paraffin diluted bitumen;
   supplying the heated high paraffin diluted bitumen to a paraffinic solvent flashing apparatus;
   separating the heated high paraffin diluted bitumen within the paraffinic solvent flashing apparatus into a flashed paraffinic solvent component and a diluted bitumen underflow component;
   deriving a hot dry bitumen from the diluted bitumen underflow component;
   wherein the pre-heating comprises serially pre-heating the high paraffin diluted bitumen and the process further comprises:
   transferring heat from the flashed paraffinic solvent component to the high paraffin diluted bitumen; and then
   transferring heat from the hot dry bitumen component to the high paraffin diluted bitumen, producing a partially cooled dry bitumen.

33. The process of claim 32, further comprising condensing the flashed paraffinic solvent component and recycling the condensed solvent as the paraffinic solvent for contacting the bitumen froth.

34. A paraffinic solvent recovery process for treating a high paraffin diluted bitumen derived from a paraffinic froth separation operation that separates a bitumen froth into a solvent diluted tailings component and the high paraffin diluted bitumen, comprising:
  pre-heating the high paraffin diluted bitumen by indirect heat transfer from at least one downstream process fluid derived from the high paraffin diluted bitumen, to produce a pre-heated high paraffin diluted bitumen, wherein the pre-heating comprises:
    directly pre-heating the high paraffin diluted bitumen by introducing a fluid therein; and
    indirectly pre-heating the high paraffin diluted bitumen by indirect heat transfer from at least one downstream process fluid derived from the high paraffin diluted bitumen;
  supplying the pre-heated high paraffin diluted bitumen to a paraffinic solvent flashing apparatus; and
  separating the pre-heated high paraffin diluted bitumen within the paraffinic solvent flashing apparatus into a flashed paraffinic solvent component and a diluted bitumen underflow component.

35. The process of claim 34, wherein directly pre-heating the high paraffin diluted bitumen comprises introducing a portion of the diluted bitumen underflow component.

36. The process of claim 35, wherein the portion of the diluted bitumen underflow component is introduced into the high paraffin diluted bitumen downstream of indirectly pre-heating the high paraffin diluted bitumen with the at least one downstream process fluid.

37. The process of claim 34, wherein the at least one downstream process fluid comprises hot dry bitumen derived from the diluted bitumen underflow component.

38. The process of claim 37, wherein the at least one downstream process fluid comprises the flashed paraffinic solvent component.

* * * * *